US011119079B2

(12) United States Patent
Weida et al.

(10) Patent No.: US 11,119,079 B2
(45) Date of Patent: Sep. 14, 2021

(54) LIQUID CHROMATOGRAPHY ANALYZER SYSTEM WITH ON-LINE ANALYSIS OF ELUTING FRACTIONS

(71) Applicant: DAYLIGHT SOLUTIONS, INC., San Diego, CA (US)

(72) Inventors: Miles James Weida, Poway, CA (US); Bruce Coy, San Diego, CA (US); David F. Arnone, Mountain View, CA (US)

(73) Assignee: DAYLIGHT SOLUTIONS, INC., San Diego, CA (US)

( * ) Notice: Subject to any disclaimer, the term of this patent is extended or adjusted under 35 U.S.C. 154(b) by 0 days.

(21) Appl. No.: 16/537,198

(22) Filed: Aug. 9, 2019

(65) Prior Publication Data

US 2019/0360982 A1    Nov. 28, 2019

Related U.S. Application Data

(63) Continuation-in-part of application No. 16/100,762, filed on Aug. 10, 2018, now Pat. No. 10,753,856.

(60) Provisional application No. 62/717,448, filed on Aug. 10, 2018, provisional application No. 62/546,991, filed on Aug. 17, 2017.

(51) Int. Cl.
*G01N 30/74* (2006.01)
*G01N 30/38* (2006.01)

(52) U.S. Cl.
CPC ............. *G01N 30/74* (2013.01); *G01N 30/38* (2013.01)

(58) Field of Classification Search
CPC .... G01N 30/74; G01N 30/38; G01N 21/3577; G01N 30/78; G01N 21/05
See application file for complete search history.

(56) References Cited

U.S. PATENT DOCUMENTS

| | | | | |
|---|---|---|---|---|
| 4,058,725 A | * | 11/1977 | Aine ................. | G01N 21/1702 250/343 |
| 5,269,937 A | * | 12/1993 | Dollinger ........... | G01N 15/0205 204/452 |
| 2008/0044309 A1 | * | 2/2008 | Yamashita ............. | G01N 30/08 422/52 |

(Continued)

OTHER PUBLICATIONS

Beskers, Timo F. et al., "High performance liquid chromatography with mid-infrared detection based on a broadly tunable quantum cascade laser". Analyst, 2014, vol. 139, pp. 2057-2064. The Royal Society of Chemistry.

(Continued)

*Primary Examiner* — Marcus H Taningco
(74) *Attorney, Agent, or Firm* — Roeder & Broder LLP; Steven G. Roeder

(57) ABSTRACT

A chromatography analyzer system (10) for analyzing a sample (12) includes a MIR analyzer (34) for spectrally analyzing a sample fraction (12A) while the sample fraction (12A) is flowing in the MIR analyzer (34). The MIR analyzer (34) includes (i) a MIR flow cell (35C) that receives the flowing sample fraction (12A), (ii) a MIR laser source (35A) that directs a MIR beam (35B) in a MIR wavelength range at the sample fraction (12A) in the MIR flow cell (35C), and (iii) a MIR detector (35D) that receives light from the sample fraction (12A) in the MIR flow cell (35C) and generates MIR data of the sample fraction (12A) for a portion of the MIR wavelength range.

22 Claims, 11 Drawing Sheets

(56) References Cited

U.S. PATENT DOCUMENTS

| | | | |
|---|---|---|---|
| 2009/0050568 A1* | 2/2009 | Fogelman | G01N 30/82 210/659 |
| 2012/0091063 A1* | 4/2012 | Bangtsson | G01N 30/42 210/656 |
| 2012/0225475 A1* | 9/2012 | Wagner | G01N 15/1434 435/288.7 |
| 2013/0319110 A1* | 12/2013 | Otera | G01N 21/3554 73/335.01 |
| 2015/0090014 A1* | 4/2015 | Goto | G01N 30/74 73/61.58 |
| 2019/0056312 A1 | 2/2019 | Arnone et al. | |

OTHER PUBLICATIONS

Brandsetter, Markus et al., "Tunable mid-infrared lasers in physical chemosensors towards the detection of physiologically relevant parameters in biofluids". Sensors and Actuators B 170, 2012, pp. 189-195. Elsevier.

Dywer, James L. et al., "Polymer Characterization by Combined Chromatography-Infrared Spectroscopy". International Journal of Spectroscopy, 2011. vol. 2011. Hindawi Publishing Corporation.

Garnier, Philippe et al., "The Glycosylation of Therapeutic Proteins". Innovations in Pharmaceutical Technology, Date Unknown. pp. 50-53.

Ghaderi, Darius et al., "Production platforms for biotherapeutic glycoproteins. Occurrence, impact, and challenges of non-human sialylation". Biotechnology and Genetic Engineering Reviews, 2012, vol. 28, pp. 147-176.

Khajehpour, Mazdak et al., "Infrared spectroscopy used to evaluate glycosylation of proteins". Analytical Biochemistry, 2006, vol. 348, pp. 40-48. Elsevier.

Marino, Karina et al., "A systematic approach to protein glycosylation analysis: a path through the maze." Nature Chemical Biology, 2010, vol. 6, pp. 713-723. Nature Publishing Group.

Paulson, J.C. et al., "Glycobiology in Biotechnology and Medicine." Essentials of Glycobiology—NCBI Bookshelft, 1999, Ch. 41. Cold Spring Harbor Laboratory Press.

* cited by examiner

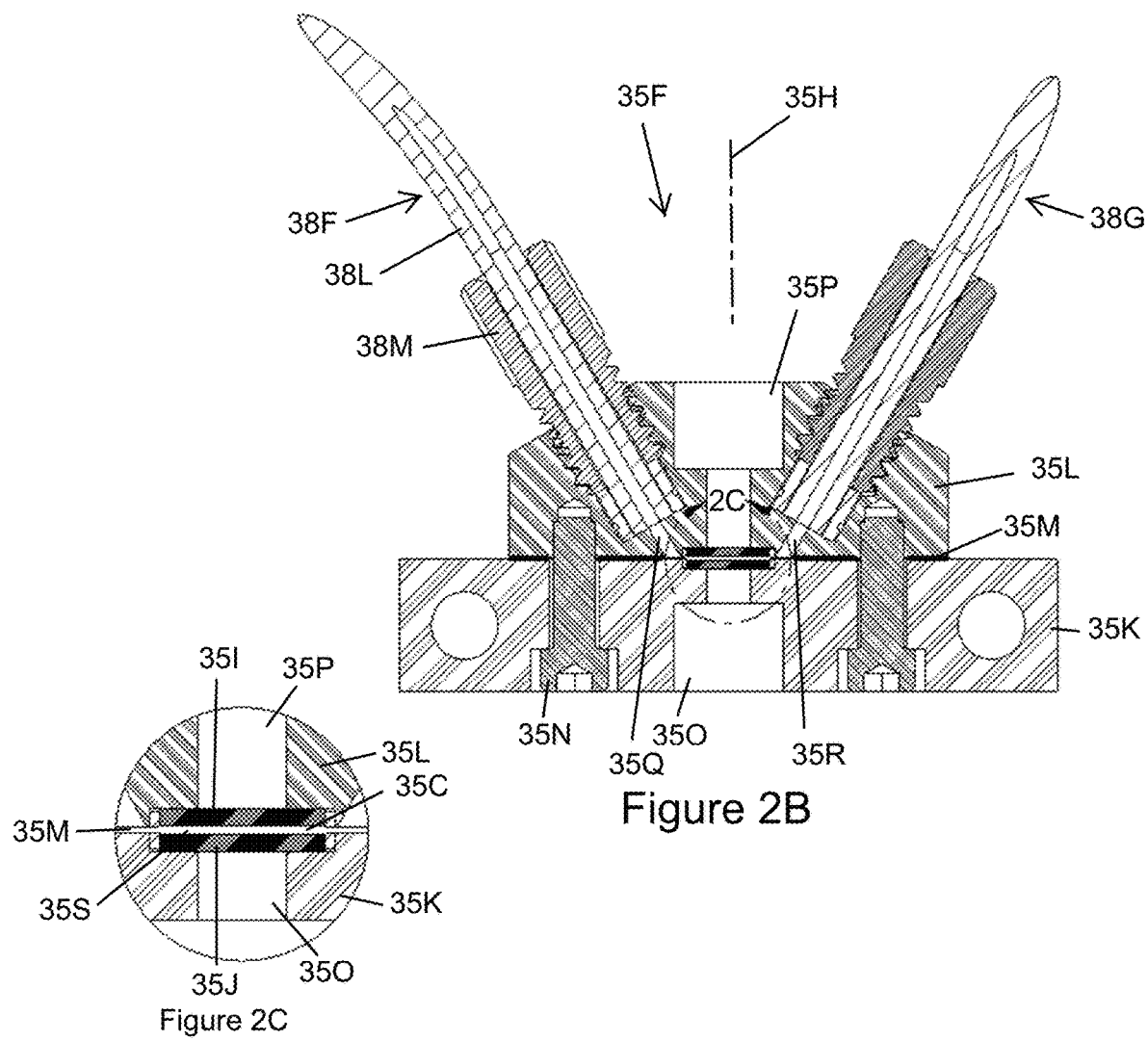

LIQUID CHROMATOGRAPHY ANALYZER SYSTEM WITH ON-LINE ANALYSIS OF ELUTING FRACTIONS

RELATED APPLICATION

This application claims priority on U.S. Provisional Application No. 62/717,448 filed on Aug. 10, 2018, and entitled "MID-INFRARED SPECTROMETER FOR ON-LINE ANALYSIS OF SAMPLE FRACTIONS FROM A LIQUID CHROMATOGRAPHY ANALYZER SYSTEM". As far as permitted, the contents of U.S. Provisional Application No. 62/717,448 are incorporated herein.

This application is a continuation-in-part of U.S. patent application Ser. No. 16/100,762 filed on Aug. 10, 2018, and entitled "FLOW CELL FOR DIRECT ABSORPTION SPECTROSCOPY". U.S. patent application Ser. No. 16/100,762 claims priority on U.S. Provisional Application No. 62/546,991 filed on Aug. 17, 2017, and entitled "FLOW CELL FOR DIRECT ABSORPTION SPECTROSCOPY". As far as permitted, the contents of U.S. patent application Ser. No. 16/100,762 and U.S. Provisional Application No. 62/546,991 are incorporated herein.

BACKGROUND

It is often useful to characterize one or more components of a liquid sample. Previously, Fourier transform infrared (FTIR) spectrometers have been used for mid-infrared (MIR) characterization of liquid samples. However, liquids present unique challenges for FTIR spectroscopy. First, most liquids have strong background absorptions. Because the optical powers per wavelength available for FTIR spectrometers are quite low due to the use of a broadband globar incandescent source, the path lengths through liquids that can be probed are quite small before the probe light is attenuated to unacceptably low values. Hence, FTIR is typically used to determine percent level fractions of components in liquids, and not trace fractions (less than one part per thousand) in liquids that would require longer liquid path lengths for adequate sensitivity. Also, this has pushed FTIR spectroscopy to use attenuated total reflectance (ATR) interfaces. These interfaces typically result in smaller path lengths, and have the problem that they distort the spectral signatures of the chemicals being probed due to a combined effect of absorption and changing refractive index on the signal. They are therefore not well suited to quantitative liquid spectroscopy, or trace detection. In addition, liquid analysis is often performed on sample mixtures that have been fractionated into their individual constituents in a liquid chromatography (LC) system. The separated constituents result in time-separated fractions that flow through an analyzer at different times. The residence time for an individual fraction in an analyzer can be quite short (tens of milliseconds to a few seconds), so the analyzer must be able to temporally resolve the MIR spectra on this time scale. FTIR instruments cannot achieve this time resolution with sensitivity to trace fractions.

As a result thereof, there is a need for a system that quickly and accurately characterizes a liquid sample.

SUMMARY

A liquid chromatography analyzer system for analyzing a first sample fraction includes a first MIR analyzer for spectrally analyzing the first sample fraction while the first sample fraction is flowing in the first MIR analyzer. The first MIR analyzer can include (i) a first MIR flow cell that receives the flowing first sample fraction, (ii) a first MIR laser source that directs a first MIR beam modulated in a first MIR wavelength range at the first sample fraction in the first MIR flow cell, and (iii) a first MIR detector that receives light from the first sample fraction in the first MIR flow cell and generates first MIR data of the first sample fraction for the first MIR wavelength range.

As an overview, the liquid chromatography analyzer system fractionates the sample into the different sample fractions, and the analyzer assembly then analyzers the sample fractions to determine the properties of the different sample fractions. As provided herein, the analyzer assembly is uniquely designed to preserve the concentrations of the sample fractions, provide enough signal to noise to accurately identify trace sample fractions, and acquire data fast enough to temporally resolve the different sample fractions as they move through the first MIR flow cell.

It should be noted that the phrase "Mid Infrared" has been abbreviated to be "MIR" for convenience in this application.

Further, the phrase "Mid Infrared range" or "MIR range" shall mean and include the spectral region or spectral band of between approximately five thousand to five hundred wavenumbers (5000-500 $cm^{-1}$), or approximately two and twenty micrometers (2-20 µm) in wavelength.

In one embodiment, the analyzer system also includes a second MIR analyzer for spectrally analyzing the first sample fraction while the first sample fraction is flowing in the second MIR analyzer. The second MIR analyzer can include (i) a second MIR flow cell that receives the flowing first sample fraction, (ii) a second MIR laser source that directs a second MIR beam in a second MIR wavelength range at the first sample fraction in the second MIR flow cell, and (iii) a second MIR detector that receives light from the first sample fraction in the second MIR flow cell and generates second MIR data of the first sample fraction for the second MIR wavelength range.

As provided herein, the first MIR analyzer and the second MIR analyzer can be arranged in series so that the first sample fraction flows from the first MIR flow cell to the second MIR flow cell. The multiple MIR analyzers in series allow for a broader, and more accurate analysis of the sample fraction(s).

Additionally, the chromatography analyzer system can also include a control and analysis system that uses the first MIR data and the second MIR data to estimate a time delay between when the first sample fraction flows from the first MIR flow cell to the second MIR flow cell.

In certain embodiments, the control and analysis system can use the first MIR data and the second MIR data to generate a combined MIR data. Further, the control and analysis system can use the combined MIR data to estimate a characteristic of the first sample fraction.

The chromatography analyzer system can also include a non-MIR analyzer for spectrally analyzing the first sample fraction in a non-MIR range while the first sample fraction is flowing in the non-MIR analyzer, the non-MIR analyzer generating non-MIR data for the non-MIR range.

Some additional non-MIR analyzers record just one bit of information for each time slice, such as ultraviolet ("UV") absorption at a particular UV wavelength as a function of time. This creates a temporal trace of the sample fractions moving through the flow cell, i.e., individual peaks in the temporal spectrum that correlate to the sample fraction entering and leaving the non-MIR analyzer. Other non-MIR analyzers, such as near infrared ("NIR") and mass spectrometers can provide a broader spectrum at each time slice as the sample fraction enters and leaves the non-MIR analyzer.

In certain embodiments, a time-response plot is generated to identify eluting sample fractions in time. Subsequently, the time-response plots are analyzed to pull out the spectra that can be used to identify one or more of the sample fractions.

In one embodiment, to obtain a clear picture of when one sample fraction enters and leaves the flow cell, the non-MIR data and/or the combined MIR data over a denoted spectral region can be used. The control and analysis system can identify one or more temporal regions of interest in the combined MIR data for when sharp sample fractions enter and leave the flow cell. The MIR data for these temporal region(s) can then be used to perform spectral and chemical analysis on the sample fraction in that time window.

Further, the control and analysis system can identify each region of interest in the combined MIR data, and then compare the mid-infrared spectra of these regions to chart chemical changes in a polydisperse sample as a function of elution time.

The non-MIR analyzer, the first MIR analyzer and the second MIR analyzer can be arranged in series so that each sample fraction flows from the non-MIR analyzer to the first MIR flow cell and then to the second MIR flow cell. The multiple analyzers in series allows for an even broader, and more accurate analysis of the sample.

In one embodiment, the control and analysis system can use the non-MIR data, the first MIR data and the second MIR data to estimate a characteristic of each sample fraction.

Additionally, or alternatively, the control and analysis system can use the non-MIR data, the first MIR data and the second MIR data to estimate one or more of (i) delay times between flow cells, (ii) volumes of sample fractions, and (iii) band broadening of sample fractions.

The chromatography analyzer system can also include a third MIR analyzer for spectrally analyzing the first sample fraction while the first sample fraction is flowing in the third MIR analyzer. The third MIR analyzer can include (i) a third MIR flow cell that receives the flowing first sample fraction, (ii) a third MIR laser source that directs a third MIR beam in a third MIR wavelength range at the first sample fraction in the third MIR flow cell, and (iii) a third MIR detector that receives light from the first sample fraction in the third MIR flow cell and generates third MIR spectral data of the first sample fraction for the third wavelength range. In certain embodiments, the first MIR analyzer, the second MIR analyzer, and the third MIR analyzer are arranged in series so that the first sample fraction flows from the first MIR flow cell to the second MIR flow cell and then to the third MIR flow cell.

In certain embodiments, each flow cell can have a volume of less than ten microliters.

In another embodiment, a method for analyzing a first sample fraction, includes: (i) directing the first sample fraction through a first MIR flow cell; (ii) directing a first MIR beam having a first center wavenumber that is rapidly changed over time in a first MIR wavelength range at the first sample fraction in the first MIR flow cell; and (iii) generating first MIR data of the first sample fraction for the first MIR wavelength range with a first MIR detector that receives light from the first sample fraction in the first MIR flow cell.

Further, the method can include (i) directing the first sample fraction through a second MIR flow cell; (ii) directing a second MIR beam having a second center wavenumber that is rapidly changed over time in a second MIR wavelength range at the first sample fraction in the second MIR flow cell; and (iii) generating second MIR data of the first sample fraction for the second MIR wavelength range with a second MIR detector that receives light from the first sample fraction in the second MIR flow cell.

Moreover, the method can include spectrally analyzing the first sample fraction in a non-MIR range with a non-MIR analyzer, the non-MIR analyzer generating non-MIR data for the non-MIR range; and estimating a characteristic of the first sample fraction using the non-MIR data and the first MIR data with a control and analysis system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2B is a cut-away view of a portion of the MIR analyzer of FIG. 2A;

FIG. 2C is an enlarged view from FIG. 2B;

DESCRIPTION

Figure 1A:
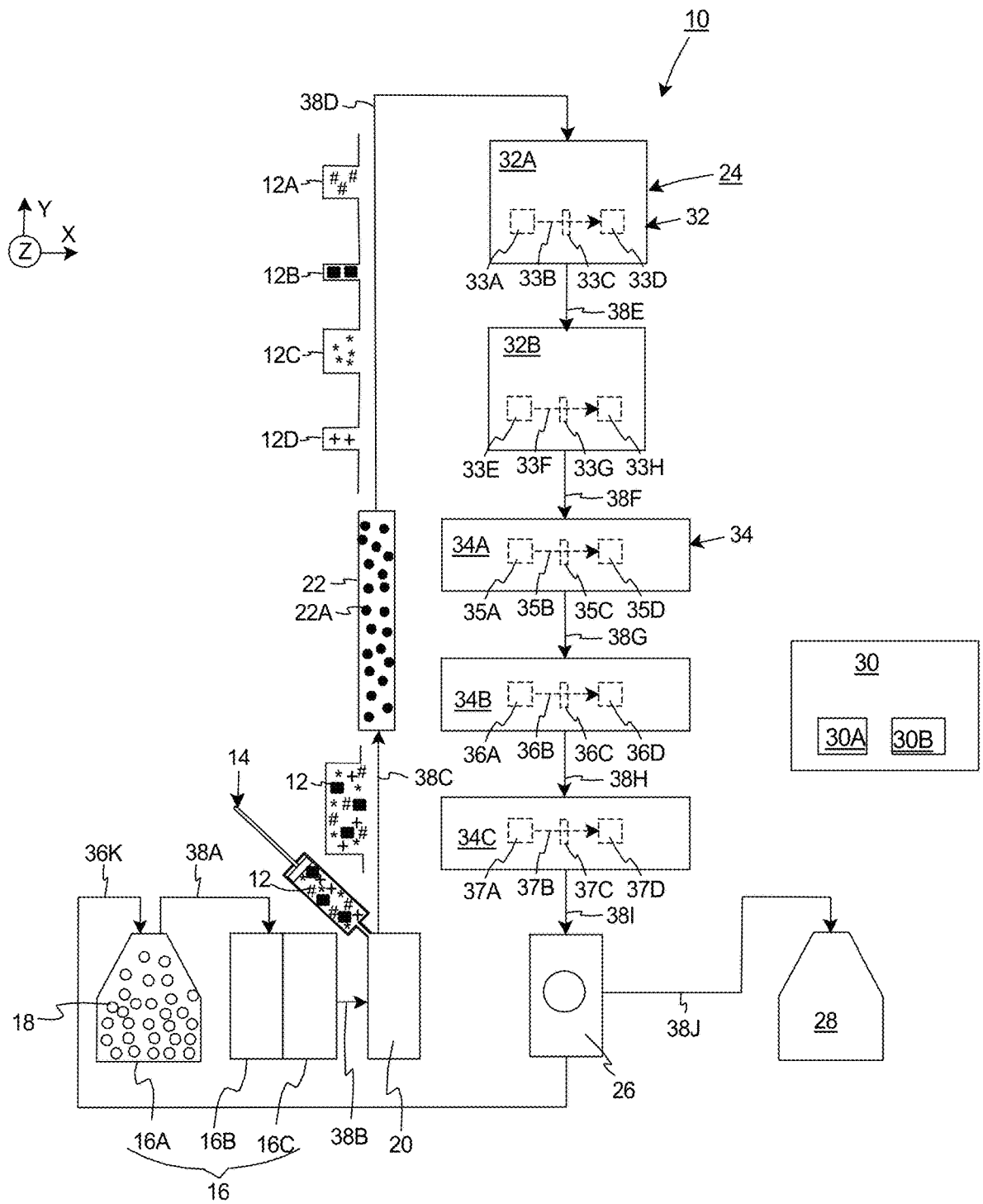
FIG. 1A is a simplified schematic illustration of a liquid chromatography analyzer system.

FIG. 1A is simplified illustration of a non-exclusive example of a liquid chromatography analyzer system 10 that utilizes liquid separation and direct absorption to spectrally analyze one or more samples 12 (one sample is illustrated with a mixture of small squares, plus signs, stars, and the number symbols in FIG. 1A) in real time. In the non-exclusive embodiment illustrated in FIG. 1A, the liquid chromatography analyzer system 10 includes (i) a sample delivery system 14 that delivers the sample 12; (ii) a solvent deliver system 16 that provides one or more mobile phase solvents 18 (illustrated with small circles in FIG. 1A) to transport the sample 12; (iii) an injector 20; (iv) a fractionator 22 (also referred to as "fractionation mechanism"); (v) an analyzer assembly 24; (vi) a valve assembly 26; (vii) a waste collection assembly 28; and (viii) a control and analysis system 30. It should be noted that the number of components and/or the positioning of the components in the chromatography analyzer system 10 can be different than that illustrated in FIG. 1A. For example, the chromatography analyzer system 10 can be designed with fewer components than illustrated in FIG. 1A.

The type of sample 12 that is spectrally analyzed can vary. As non-exclusive examples, the sample 12 can be a liquid, a complex mixture of multiple liquids, or a complex mixture of liquids, dissolved chemicals, solvents, and/or solids. In certain embodiments, the sample 12 is a complex mixture that includes one or more different constituents (also referred to as "components"). In certain embodiments, the sample 12 is prepared for analysis with one or more preparation solvents (not shown) prior to injection into the chromatography analyzer system 10. The term "sample" as used herein, can refer to the original sample obtained, and/or a sample mixture created by the preparation of the sample 12 with the preparation solvent(s).

The type of preparation solvent(s) utilized can be varied according to the type of sample 12. As non-exclusive examples, suitable preparation solvent(s) include water, phosphate-buffered saline (PBS), dimethyl sulfoxide (DMSO), isopropyl alcohol, methyl alcohol, toluene, or tetrahydrofuran (THF).

As provided herein, one or more individual sample fractions 12A-12D (also referred to as "aliquots") elute from the fractionator 22 over time as the sample 12 passes through the fractionator 22. Thus, the individual sample fractions 12A-12D elute from the fractionator 22 at different times, and the individual sample fractions 12A-12D move through the analyzer assembly 24 at different times.

Depending on the fractionator 22 design, different sample fractions 12A-12D might contain different constituents of the original sample 12. The sample fractions 12A-12D are not always chemically pure, and can still contain mixtures of more than one component from the original sample 12.

It should be noted that the number of sample fractions 12A-12D will vary according to many factors, including the type of sample 12, the solvent(s) 18, and the design of the fractionator 22. The non-exclusive example in FIG. 1A illustrates four different individual sample fractions 12A-12D, with each sample fraction 12A-12D represented by a separate pulse (spaced apart in time) in a pulse wave. More specifically, in this example, (i) a first sample fraction 12A (illustrated with number symbols) is eluted first in time from the fractionator 22, and will be directed to the analyzer assembly 24 first: (ii) a second sample fraction 12B (illustrated with small squares) is eluted second in time from the fractionator 22, and will be directed to the analyzer assembly 24 second; (iii) a third sample fraction 12C (illustrated with stars) is eluted third in time from the fractionator 22, and will be directed to the analyzer assembly 24 third; and (iv) a fourth sample fraction 12D (illustrated with plus signs) is eluted last from the fractionator 22, and will be directed to the analyzer assembly 24 last. Alternatively, more than four or fewer than four sample fractions 12A-12D can elute from the fractionator 22, depending on the sample 12 and the design of the fractionator 22.

In should be noted that the size of each sample fraction 12A-12D and the spacing between the sample fractions 12A-12D will vary according to many factors, including the type of sample 12 and the design of the fractionator 22.

Typically the sample 12 to be analyzed can be quite small in volume. For example, it is not unusual to only produce protein samples 12 that are ten, twenty, fifty, or one hundred microliters in volume. These samples 12 can be relatively high in concentration (for example 0.1, 0.2, 0.5, 1.0, 2.0, 5.0, or 10.0 g/L).

As an overview, the liquid chromatography analyzer system 10 fractionates the sample mixture 12 and the solvents 18 into different sample fractions 12A-12D, and the analyzer assembly 24 then sequentially analyzes the sample fractions 12A-12D to determine the properties of the different sample fractions 12A-12D. As provided herein, in one embodiment, the analyzer assembly 24 is uniquely designed to include one or more non-MIR analyzers 32, and/or one or more MIR analyzers 34 that are arranged in series to spectrally analyze the sample 12 with improved accuracy.

More specifically, the different types of analyzers 32, 34 are desirable because each provides complimentary information on the sample fractions 12A-12D. For example, each analyzer 32, 34 can analyze a different portion of the spectral region important for different chemicals. With this design, the multiple analyzers 32, 34 in series allow expanded spectral coverage and chemical sensitivity. Additionally, the multiple analyzers 32, 34 of the analyzer assembly 24 provide enough signal to noise to accurately identify trace sample fractions 12A-12D in the sample 12.

Moreover, the analyzer assembly 24 is uniquely designed to preserve the temporal characteristics of the sample fractions 12A-12D as they flow through the multiple analyzers 32, 34 of the analyzer assembly 24. For example, if the first sample fraction 12A that exits the fractionator 22 has a sharp concentration peak that grows in and dies out after two seconds, the analyzer assembly 24 provided herein is designed to preserve this temporal peak profile as the first sample fraction 12A moves through the multiple analyzers 32, 34. An expansion of the temporal peak profile is referred to as band broadening. Thus, the analyzer assembly 24 provided herein inhibits band broadening.

Further, the MIR analyzers 34 are uniquely designed to have a small sample volume, fast data acquisition, and high sensitivity. This allows for one or more MIR analyzers 34 to be used in conjunction with other non-MIR analyzers 32 to identify the sample fractions 12A with improved accuracy.

In certain embodiments, each MIR analyzer 34 can spectrally analyze a different portion of the MIR spectral range, and generate separate MIR temporal data and separate MIR spectral data for one or more (e.g. all) sample fraction 12A-12D. The MIR temporal data and/or the MIR spectral data can be referred to generically as "MIR data".

The separate MIR temporal data from multiple MIR analyzers 34 can be combined to generate a combined MIR temporal data for a portion or the entire MIR range for one or more (e.g. all) sample fractions 12A-12D. Additionally, or alternatively, the separate MIR spectral data from multiple MIR analyzers 34 can be combined to generate a combined MIR spectral data for a portion or the entire MIR range for one or more (e.g. all) sample fraction 12A-12D. The combined MIR temporal data and/or the combined MIR spectral data can be referred to generically as "combined MIR data".

In one embodiment, the combined MIR data can be analyzed to determine delay volumes between the MIR analyzers 34. Further, the combined MIR spectral data can be combined with the non-MIR spectral data from the non-MIR analyzer(s) 32 to calculate a combined spectral data of each sample fraction 12A-12D over a large spectral range. For example, the combined spectral data can cover a portion or the entire infrared spectral range. Alternatively, the combined spectral data can cover a portion or the entire ultraviolet range, and a portion or the entire MIR spectral range.

In one embodiment, the MIR temporal data from multiple MIR analyzers 34 is used to develop a time-resolved picture of when each sample fraction 12A-12D is traveling through each analyzer 32, 34 in the analyzer assembly 24. Stated in another fashion, the time-resolved peaks in the combined MIR temporal data can be used as temporal regions of interest that can identify when the sample fractions 12A-12D are traveling in the respective MIR analyzers 34.

Subsequently, the MIR spectral data and/or non-MIR spectral data over each peak (or region of interest) in the MIR temporal data can be analyzed to chemically or spectrally identify what is in each sample fraction 12A-12D. Stated in another fashion, temporal regions of interest in the combined response as function of time from the analyzer assembly 24 (e.g. the non-MIR data and/or the combined MIR data) can be determined to calculate mid-infrared spectra for either sharp sample fractions 12A-12D, or to show chemical change across an elution for a polydisperse sample fraction 12A-12D.

An important part of including the one or more MIR analyzers 34 in the liquid chromatography analyzer system 10 is the ability to couple the one or more MIR analyzers 34 in series with one or more non-MIR analyzers 32. Different analyzers 32, 34 types are desirable because each provides complimentary information on the sample 12. If multiple analyzers 32, 34 are utilized, each analyzer 32, 34 can analyze a different property (e.g. a different spectral region) important for different chemicals, so the multiple analyzers 32, 34 in series allow expanded spectral coverage and chemical sensitivity. This allows for the accurate identification of trace sample fractions 12A-12D.

In the embodiment illustrated in FIG. 1A, the liquid chromatography analyzer system 10 works by flowing one or more liquid solvents 18 and the sample 12 through the fractionator 22 to generate the time separated sample fractions 12A-12D. Subsequently, the sample fractions 12A-12D individually and sequentially flow (spaced apart in time) through the analyzers 32, 34 to spectrally analyze the sample fractions 12A-12D over a relatively broad spectral range. The flow of the liquid solvent 18 and the sample 12 through the fractionator 22 and in the analyzer assembly 24 can be substantially constant or variable.

The sample delivery system 14 delivers the sample 12 into the liquid chromatography analyzer system 10. In FIG. 1A, the sample delivery system 14 is in fluid communication with and delivers the sample 12 to the injector 20 where it is injected into the flowing, mobile phase solvents 18. In one, non-exclusive embodiment, the sample deliver system 14 is somewhat similar to a syringe that directs the sample 12 into the injector 20. Alternatively, the sample delivery system 14 can have another design.

The solvent deliver system 16 is in fluid communication with the injector 20, and the solvent delivery system 16 provides one or more mobile phase solvents 18 that transport the sample 12 through the fractionator 22 and the analyzer assembly 24. In one embodiment, the solvent deliver system 16 includes one or more solvent reservoirs 16A (one illustrated in FIG. 1), a de-gasser 16B that removes gas from the solvents 18, and a pump assembly 16C. In this embodiment, the pump assembly 16C pumps the one or more mobile phase solvents 18 from the one or more solvent reservoirs 16A, through the de-gasser 16B, into the injector 20, through the fractionator 22, into the analyzer assembly 24, and finally to the valve assembly 26. The fluid pump assembly 16C can include one or more pumps.

Further, the fluid pump assembly 16C can direct the sample 12 and the mobile phase solvent(s) 18 at a substantially constant rate to flow through the analyzer assembly 24 to analyze the sample fractions 12A-12D relatively quickly. As alternative, non-exclusive examples, the fluid pump assembly 16C can direct the sample 12 and mobile phase solvent(s) 18 at a substantially constant flow rate of approximately 0.1 mL/min, 0.2 mL/min, 0.5 mL/min, 0.7 mL/min, 1.0 mL/min, 2.0 mL/min, or 5.0 mL/min through the analyzer assembly 24. Alternatively, the fluid pump assembly 16C can direct the sample 12 and mobile phase solvent(s) 18 at a variable flow rate through the analyzer assembly 24, under the control of the control and analysis system 30.

In FIG. 1A, the fluid pump assembly 16C is located near the solvent reservoir 16A. Alternatively, the fluid pump assembly 16C can include one or more pumps located at other positions along the flow path.

The type of mobile phase solvent(s) 18 utilized can be varied according to the type of sample 12. As non-exclusive examples, suitable mobile phase solvents 18 include water, phosphate-buffered saline (PBS), dimethyl sulfoxide (DMSO), isopropyl alcohol, methyl alcohol, toluene, or tetrahydrofuran (THF). It should be noted that one or more of the mobile phase solvent(s) 18 can be similar or different to one or more of the preparation solvent(s).

The injector 20 introduces the sample 12 into the stream of flowing mobile phase solvent(s) 18, where it is entrained in the flowing solvent(s) 18 and moved to the fractionator 22. The entrained sample 12 is represented with a square pulse wave in FIG. 1A. In certain embodiments, if the preparation solvent is different from the mobile phase solvent 18, the preparation solvent will often result in separate a sample fraction (not illustrated in FIG. 1A) that shows up later in the analyzers 32, 34 (see for example the dipping time peak 1 in FIG. 7A, and the corresponding spectrum of the preparation solvent in FIG. 7B).

The injector 20 can include an injection loop (not shown) that entrains the sample 12 in the flowing mobile phase solvent(s) 18. As non-exclusive examples, the injection loop can have a volume of five, ten, twenty, fifty, seventy-five, or one hundred microliters (5 µL, 10 µL, 20 µL, 50 µL, 75 µL, or 100 µL).

The entrained sample 12 flows from the injector 20 to the fractionator 22, and the fractionator 22 fractionations the sample 12 into different fractions 12A-12D based on the physical and/or chemical properties of the sample 12 (e.g. size or mobility). In one embodiment, the fractionator 22 is a column that fractionates the sample 12 into one or more different sample fractions 12A-12D. In certain embodiments, the fractionator 22 includes a fractionation medium 22A (illustrated with small dots) that fractionates the sample 12 based on the physical and/or chemical properties of the components of the sample 12. For example, the fractionation medium 22A can be a gel or some medium that fractionates chemicals based on their size or affinity with the gel.

In certain alternative embodiments, the fractionation medium 22A has a volume of less than ten, twenty, fifty, one hundred, or two hundred microliters. The small volume of the fractionation medium 22A preserves the high concentration of the original sample 12 during the fractionation process. Otherwise the sample 12 gets significantly diluted and broadened in time so that there is a poor fractionation into the sample fractions 12A-12D, and/or the sample fractions 12A-12D do not have individual sharp temporal peaks.

Figures 1B, 1C:
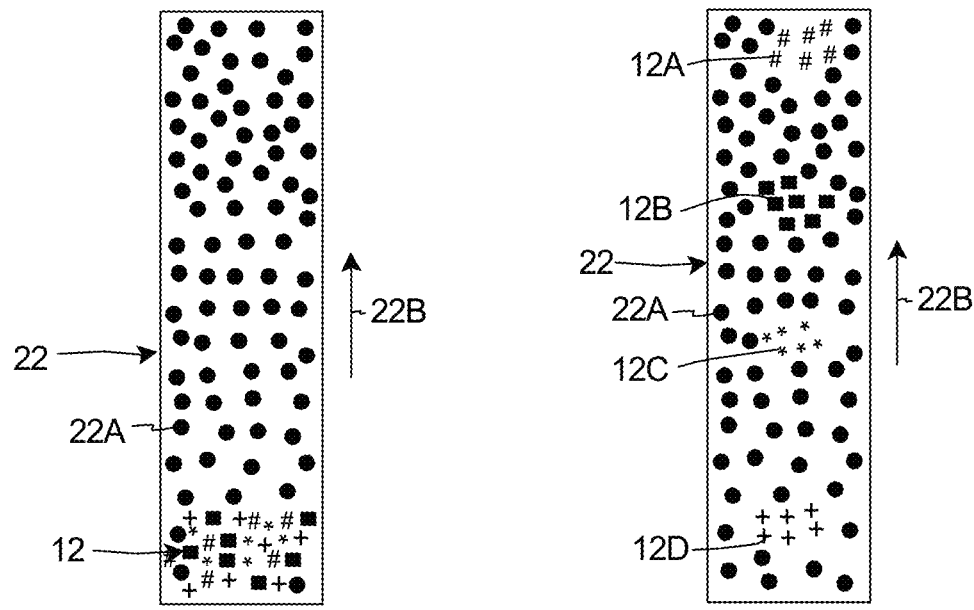
FIG. 1B is a simplified schematic of a fractionator of the liquid chromatography analyzer system of FIG. 1A at a first time.
FIG. 1C is a simplified schematic of the fractionator of FIG. 1B at a second time.

FIG. 1B is a simplified schematic of the fractionator 22 at a first time when the sample 12 has just entered the fractionator 22. At this time, the sample 12 has just entered the fractionator 22 and it has not been significantly fractionated by the fractionation medium 22A. A flow direction 22A (illustrated with an arrow) of the sample 12 in the fractionator 22 is from the bottom to the top of the page.

FIG. 1C is a simplified schematic of the fractionator 22 at a second time that is later than the first time. As illustrated in FIG. 1C, at this time, the sample 12 (referenced in FIG. 1B) is being fractionated into the four sample fractions 12A during movement in the flow direction 22B. In this example, (i) the first sample fraction 12A (number symbols) is moving through the fractionator 22 first, (ii) the second sample fraction 12B (small squares) is moving through the fractionator 22 next, (iii) the third sample fraction 12C (stars) is moving through the fractionator 22 next, and (iv) the fourth sample fraction 12D (plus signs) is moving through the fractionator 22 last. With this design, the different sample fractions 12A-12D will elute from the fractionator 22 at different times, and different sample fractions 12A will subsequently move through the analyzer assembly 24 (illustrated in FIG. 1A) at different times. Stated in another fashion, a constant flow of solvent 18 through the fractionator 22 causes the sample fractions 12A-12D elute from the analyzer assembly 24 at different times for analysis at different times.

It should be noted that each sample fraction 12A-12D can be changing in time as they flow through the analyzers 32, 34. For example, each sample fraction 12A-12D can chemically and spectrally evolve as they flow through the analyzers 32, 34. Further, each sample fraction 12A-12D can dilute and broaden as it moves through the analyzers 32, 34.

Referring back to FIG. 1A, the analyzer assembly 24 is in fluid communication with the fractionator 22, and the analyzer assembly 24 individually analyzes the sample fractions 12A-12D of the sample 12. As provided above, the analyzer assembly 24 can include one or more non-MIR analyzers 32 and/or one or more MIR analyzers 34 that are arranged in series to determine the properties of the different sample fractions 12A-12D as they elute (flow from) the fractionator 22.

In the non-exclusive example illustrated in FIG. 1A, the analyzer assembly 24 includes two non-MIR analyzers 32, and three MIR analyzers 34 that are arranged in series. Alternatively, the analyzer assembly 24 can be designed to include (i) more than two or fewer than two non-MIR analyzers 32, and/or (ii) more than three or fewer than three MIR analyzers 34 that are arranged in series. For example, in other, non-exclusive examples, the analyzer assembly 24 can include (i) one non-MIR analyzer 32, and one MIR analyzer 34 that are arranged in series; (ii) one non-MIR analyzer 32, and two MIR analyzers 34 that are arranged in series; (iii) one non-MIR analyzer 32, and three or more MIR analyzers 34 that are arranged in series; (iv) two or more non-MIR analyzers 32, and one MIR analyzer 34 that are arranged in series; (v) two or more non-MIR analyzers 32, and two MIR analyzers 34 that are arranged in series; (vi) two or more non-MIR analyzers 32, and three or more MIR analyzers 34 that are arranged in series; (vii) no non-MIR analyzers, and one MIR analyzer 34; (viii) no non-MIR analyzer, and two MIR analyzers 34 that are arranged in series; and (ix) no non-MIR analyzer, and three or more MIR analyzers 34 that are arranged in series.

In FIG. 1A, (i) the non-MIR analyzers 32 of the analyzer assembly 24 can be referenced as a first non-MIR analyzer 32A, and a second non-MIR analyzer 32B; and (ii) the MIR analyzers 34 of the analyzer assembly 24 can be referenced as a first MIR analyzer 34A, a second MIR analyzer 34B, and a third MIR analyzer 34C. In the non-exclusive example illustrated in FIG. 1A, the two non-MIR analyzers 32 are positioned before the three MIR analyzers 34 in series. With this design, the sample fractions 12A-12D individually and sequentially flow (i) from the fractionator 22 to the first non-MIR analyzer 32A, (ii) from the first non-MIR analyzer 32A to the second non-MIR analyzer 32B, (iii) from the second non-MIR analyzer 32B to the first MIR analyzer 34A, (iv) from the first MIR analyzer 34A to the second MIR analyzer 34B, and (v) from the second MIR analyzer 34B to the third MIR analyzer 34C.

However, the analyzers 32, 34 can be arranged in a different fashion than illustrated in FIG. 1A. For example, the analyzers 32, 34 can be arranged so that the sample fractions 12A-12D sequentially flow (i) from the fractionator 22 to the first non-MIR analyzer 32A, (ii) from the first non-MIR analyzer 32A to the first MIR analyzer 34A, (iii) from the first MIR analyzer 34A to the second MIR analyzer 34B, (iv) from the second MIR analyzer 34B to the third MIR analyzer 34C, and (v) from the third MIR analyzer 34C to the second non-MIR analyzer 32B.

In one embodiment, (i) the first non-MIR analyzer 32A generates separate first non-MIR data for each of the sample fractions 12A-12D, (ii) the second non-MIR analyzer 32B generates separate second non-MIR data for each of the sample fractions 12A-12D, (iii) the first MIR analyzer 34A generates separate first MIR data for each of the sample fractions 12A-12D, (iv) the second MIR analyzer 34B generates separate second MIR data for each of the sample fractions 12A-12D, and (v) the third MIR analyzer 34C generates separate third MIR data for each of the sample fractions 12A-12D. For each sample fraction 12A-12D, the MIR data can be combined to generate the combined MIR data. Further, for each sample fraction 12A-12D, the combined MIR data can be combined with the non-MIR data to generate combined data.

The design of each non-MIR analyzer 32 can be varied. In one non-exclusive example, one or each non-MIR analyzer 32 is a spectroscopic analyzer that analyzes the sample fractions 12A-12D at one or more wavelengths outside of the MIR range. As provided above, the MIR range is the spectral band of between approximately five thousand to five hundred wavenumbers (5000-500 cm$^{-1}$), or approximately two and twenty micrometers (2-20 μm) in wavelength. Thus, each non-MIR analyzer 32 can be designed to spectrally analyze the sample fractions 12A at greater than five thousand wavenumbers or less than five hundred wavenumbers. Stated in another fashion, each non-MIR analyzer 32 can be designed to spectrally analyze the sample fractions 12A at greater than twenty micrometers or less than two micrometers.

It should be noted that (i) the first non-MIR analyzer 32A can be designed to spectrally analyze the sample fractions 12A-12D at a first non-MIR wavenumber or over a first non-MIR spectral range; and/or (ii) the second non-MIR analyzer 32B can be designed to spectrally analyze the sample fractions 12A-12D at a second non-MIR wavenumber or over second non-MIR spectral range. For example, (i) the first non-MIR wavenumber can be different than the second non-MIR wavenumber; (ii) the first non-MIR wavenumber can be outside the second non-MIR spectral range; (iii) the second non-MIR wavenumber can be outside the first non-MIR spectral range; (iv) the first non-MIR spectral range can be fully or at least partly different from the second non-MIR spectral range; or (v) the first non-MIR spectral range and/or the second non-MIR spectral range can be fully or at least partly outside of the MIR range.

Non-exclusive examples of suitable non-MIR analyzers 32 can include ultraviolet absorption spectrometers; refractive index ("RI") analyzers; Rayleigh light scattering analyzers; multi-angle-light-scattering instruments ("MALS"); near infrared ("NIR") analyzers; viscosity measurement devices; and/or mass spectrometers.

As a non-exclusive example, the first non-MIR analyzer 32A can include a first non-MIR light source 33A (illustrated in phantom) that generates a first non-MIR beam 33B (illustrated in phantom), a first non-MIR flow cell 33C (illustrated in phantom), and a first non-MIR detector 33D (illustrated in phantom). With this design, the first non-MIR light source 33A directs the first non-MIR beam 33B at the sample fractions 12A-12D sequentially flowing through the first non-MIR flow cell 33C, and the first non-MIR detector 33D detects the light from (e.g. transmitted through the sample fractions 12A-12D) the first non-MIR flow cell 33C to generate first non-MIR spectral data.

Similarly, the second non-MIR analyzer 32B can include a second non-MIR light source 33E (illustrated in phantom) that generates a second non-MIR beam 33F (illustrated in phantom), a second non-MIR flow cell 33G (illustrated in phantom), and a second non-MIR detector 333H (illustrated in phantom). With this design, the second non-MIR light source 33E directs the second non-MIR beam 33F at the sample fractions 12A-12D flowing through the second non-MIR flow cell 33G, and the second non-MIR detector 33H detects the light from (e.g. transmitted through the sample fractions 12A-12D) the second non-MIR flow cell 33G to generate second non-MIR spectral data.

It should be noted that (i) the first non-MIR light source 33A can be a fixed wavelength source that is not tunable; or (ii) the first non-MIR light source 33A can be rapidly tuned over the first non-MIR spectral range while each sample fraction 12A-12D is flowing through the first, non-MIR flow cell 33C. Similarly, (i) the second non-MIR light source 33E can be a fixed wavelength source that is not tunable; or (ii) the second non-MIR light source 33E can be rapidly tuned over the second non-MIR spectral range while each sample fraction 12A-12D is flowing through the second, non-MIR flow cell 33G.

The MIR analyzer(s) 34 cooperate to analyze the sample fraction 12A over a portion or the entire MIR range. The design of each MIR analyzer 34 can be varied.

As a non-exclusive example, the first MIR analyzer 34A can include a first MIR laser source 35A (illustrated in phantom) that generates a first MIR laser beam 35B (illustrated in phantom), a first MIR flow cell 35C (illustrated in phantom), and a first MIR detector 35D (illustrated in phantom). With this design, the first MIR laser source 35A directs the first MIR laser beam 35B at the sample fractions 12A-12D sequentially flowing through the first MIR flow cell 35C, and the first MIR detector 35D detects the light from (e.g. transmitted through the sample fractions 12A-12D) the first MIR flow cell 35C to generate first MIR spectral data.

Similarly, the second MIR analyzer 34B can include a second MIR laser source 36A (illustrated in phantom) that generates a second MIR laser beam 36B (illustrated in phantom), a second MIR flow cell 36C (illustrated in phantom), and a second MIR detector 36D (illustrated in phantom). With this design, the second laser source 36A directs the second MIR laser beam 36B at the sample fractions 12A-12D sequentially flowing through the second MIR flow cell 36C, and the second MIR detector 36D detects the light from (e.g. transmitted through the sample fractions 12A-12D) the second MIR flow cell 36C to generate second MIR spectral data.

Moreover, the third MIR analyzer 34C can include a third MIR laser source 37A (illustrated in phantom) that generates a third MIR laser beam 37B (illustrated in phantom), a third MIR flow cell 37C (illustrated in phantom), and a third MIR detector 37D (illustrated in phantom). With this design, the third MIR laser source 37A directs the third MIR laser beam 37B at the sample fractions 12A-12D sequentially flowing through the third MIR flow cell 37C, and the third MIR detector 37D detects the light from (e.g. transmitted through the sample fractions 12A-12D) the third MIR flow cell 37C to generate third MIR spectral data.

In one non-exclusive example, each MIR analyzer 34A, 34B, 34C can analyze the sample fractions 12A-12D at a different portion of the MIR range. For example, (i) the first MIR laser source 35A can be tuned so that a first center wavenumber of the first MIR laser beam 35B varies over a first MIR spectral range while each sample fraction 12A-12D is sequentially flowing in the first MIR flow cell 35C; (ii) the second MIR laser source 36A can be tuned so that a second center wavenumber of the second MIR laser beam 36B varies over a second MIR spectral range while each sample fraction 12A-12D is sequentially flowing in the second MIR flow cell 36C; and (iii) the third MIR laser source 37A can be tuned so that a third center wavenumber of the third MIR laser beam 37B varies over a third MIR spectral range while each sample fraction 12A-12D is sequentially flowing in the third MIR flow cell 37C.

In certain embodiments, (i) the first MIR laser source 35A is tuned to modulate (dither) the first center wavenumber one or more cycles (spectral sweeps) over the first MIR spectral range while each sample fraction 12A-12D is in the first MIR flow cell 35C; (ii) the second MIR laser source 36A is tuned to modulate the second center wavenumber one or more cycles over the second MIR spectral range while each sample fraction 12A-12D is in the second MIR flow cell 36C; and (iii) the third MIR laser source 37A is tuned to modulate the third center wavenumber one or more cycles over the third MIR spectral range while each sample fraction 12A-12D is in the third MIR flow cell 37C. In alternative, non-exclusive examples, one or more of the MIR laser sources 35A, 36A, 37A can have a modulation rate of one, five, ten, or one hundred hertz.

In one non-exclusive example, the first sample fraction 12A is flowing in the first MIR flow cell 35C for approximately ten seconds. In this example, if the first MIR laser source 35A is modulated at a one hertz rate, then the first center wavenumber will be cycled ten times over the first MIR spectral range while the first sample fraction 12A is in the first MIR flow cell 35C. Alternatively, if the first MIR laser source 35A is modulated at a ten hertz rate, then the first center wavenumber will be cycled one hundred times over the first MIR spectral range while the first sample fraction 12A is in the first MIR flow cell 35C.

Further, the MIR spectral ranges can each be completely or partly overlapping. It should be noted that each MIR analyzer 34A-34C can be designed to target one or more specific chemicals or substances. In alternative, non-exclusive examples, each MIR spectral range can span at least five, ten, twenty, thirty, forty, fifty, or sixty percent of the MIR range. As a non-exclusive example, the first MIR spectral range can be eight to ten microns (8 to 10 μm) for sugars, the second MIR spectral range can be five and one-half to seven and one-half microns (5.5 to 7.5 μm) for proteins, and the third MIR spectral range can be 3.3 to 6.0 um for lipids. However, other MIR spectral ranges can be utilized for each MIR analyzer 34A-34C.

As described above and illustrated in FIG. 1A, one or more analyzers 32, 34 can be coupled in series in the liquid chromatography analyzer system 10. With this design, as the different sample fractions 12A-12D arrive at the different flow cells 33C, 33G, 35C, 36C, 37C, each of the analyzers 33A, 33B, 34A, 34B, 34C can record the spectral data as a function of time. For example, in the non-exclusive example illustrated in FIG. 1A, each sample fraction 12A-12D will sequentially arrive at the first non-MIR flow cell 33C, the second non-MIR flow cell 33G, the first MIR flow cell 35C, the second MIR flow cell 36C, and then the third MIR flow cell 37C.

The valve assembly 26 is in fluid communication with the analyzer assembly 24. In one, non-exclusive embodiment, the valve assembly 26 (i) receives the sample 12 and solvent 18 that has traveled through the analyzer assembly 24, (ii) selectively directs the sample 12 that is traveled through the analyzer assembly 24 to the waste collection assembly 28, and (iii) selectively directs any solvent 18 that can be recovered to the solvent reservoir 16A.

The waste collection assembly 28 is in fluid communication with valve assembly 26 and receives sample 12 that has been analyzed by the analyzer assembly 24. For example, the waste collection assembly 28 can include one or more receptacles.

The control and analysis system 30 controls one or more components of the chromatography analyzer system 10. For example, the control and analysis system 30 can control the operation of the sample delivery system 14, the solvent delivery system 16, the injector 20, the non-MIR analyzers 32, the MIR analyzers 34, the valve assembly 26, and/or the waste collection assembly 282, and the fraction collector assembly 34. Moreover, the control and analysis system 30 can analyze the data generated by the analyzer assembly 24 to characterize one or more components of the sample 12 and/or sample fractions 12A-12D.

In certain embodiments, the control and analysis system 30 can utilize the one or more of the non-MIR data, and/or one or more of the MIR data to estimate (i) time delays of the sample fractions 12 between the respective flow cells; (ii) spectral regions of interest; (iii) band broadening of the sample fractions 12 as they flow through the flow cells; and/or (iv) one or more characteristics of one or more of the sample fractions 12A-12D. Further, the control and analysis system 30 can utilize (i) the non-MIR data from the two non-MIR analyzers 32A, 32B to generate a combined non-MIR data for one or more of the sample fractions 12A-12D; (ii) the MIR data from two or more MIR analyzers 34A, 34B, 34C to generate a combined MIR data response for one or more of the sample fractions 12A-12D; and/or (iii) the non-MIR data from one or more non-MIR analyzers 32, and the MIR data from one or more MIR analyzers 34 to generate a combined data for one or more of the sample fractions 12A-12D.

Moreover, in certain embodiments, the control and analysis system 30 can include one or more processors 30A and/or electronic data storage devices 30B. It should be noted that the control and analysis system 30 is illustrated in FIG. 1A as a single, central processing system. Alternatively, the control and analysis system 30 can be a distributed processing system. Additionally, the control and analysis system 30 can include a display (e.g. LED display) that displays the test results.

In the non-exclusive embodiment illustrated in FIG. 1A, (i) the solvent reservoir 16A is connected in fluid communication with the de-gasser 16B and the pump assembly 16C with a first conduit 38A; (ii) the de-gasser 16B and the pump assembly 16C is connected in fluid communication to the injector 20 with a second conduit 38B; (iii) the injector 20 is connected in fluid communication to the fractionator 22 with a third conduit 38C; (iv) the fractionator 22 is connected in fluid communication to the first non-MIR analyzer 32A with a fourth conduit 38D; (v) the first non-MIR analyzer 32A is connected in fluid communication to the second non-MIR analyzer 32B with a fifth conduit 38E; (vi) the second non-MIR analyzer 32B is connected in fluid communication to the first MIR analyzer 34A with a sixth conduit 38F; (vii) the first MIR analyzer 34A is connected in fluid communication to the second MIR analyzer 34B with a seventh conduit 38G; (viii) the second MIR analyzer 34B is connected in fluid communication to the third MIR analyzer 34C with a eight conduit 38H; (ix) the third MIR analyzer 34C is connected in fluid communication to the valve assembly 26 with a ninth conduit 38I; (x) the valve assembly 26 is connected in fluid communication to the waste collection assembly 28 with a tenth conduit 38J; and (xi) the valve assembly 26 is connected in fluid communication to the solvent reservoir 16A with an eleventh conduit 38K. For example, each conduit 38A-38K can be a piece of tubing.

As provided above, the sample 12 to be analyzed can be quite small in volume. For example, it is not unusual for a protein sample 12 to have a volume of less than ten, twenty, fifty, or one-hundred microliters. These samples 12 might be relatively high in concentration (for example 0.1, 0.2, 0.5, 1.0, 2.0, 5.0, or 10.0 g/L), but to preserve these high concentrations to provide enough signal to noise in the downstream analyzers 32, 34, it is necessary to not dilute the original sample 12 significantly. This is accomplished by using relatively small volume tubing 38A-38K between the different components of the liquid chromatography analyzer system 10. For example, one or more of the pieces of tubing 38A-38K can have an inner diameter of less than 120, 170, 250, or 500 micrometers.

Moreover, the separation medium 22A can have a small volume, e.g. less than 10, 20, 50, 100, 200 microliters. This preserves the relatively high concentrations of the sample 12 and sample fractions 12A-12D, and inhibits band broadening of the sample 12 and sample fractions 12A-12D as the sample 12 moves in the chromatography analyzer system 10.

There are two figures of merit for the analyzers 32, 34 around volume. First, the volume of each flow cell 33C, 33G, 35C, 36C, 37C must be relatively small, comparable to the volume of the fractionation medium 22A. Secondly, each analyzer 32, 34 should introduce as little mixing of the sample fractions 12A-12D as possible so that multiple analyzers 32, 34 can be used serially. Such mixing and temporal dilution is called band broadening, and represents the dilution of the sample fractions 12A-12D with the mobile phase solvent 18.

As provide herein, in certain embodiments, each analyzer 32, 34 can be designed to inhibit band broadening of the sample fractions 12A-12D and preserve the quality of the sample fractions 12A-12D as they move through the analyzers 32, 34. This allows for multiple analyzers 32, 34 to utilized in series while having low band broadening of the sample fractions 12A-12D. For example, each MIR analyzer 34 can be designed with relatively small flow cells 35C, 36C, 37C and smooth transitions. As non-exclusive examples, one or more (e.g. all) of the flow cell 33C, 33G, 35C, 36C, 37C has an internal volume of less than approximately 1, 2, 5, 10, 20 30, 40, or 50 microliters.

As alternative, non-exclusive examples, each analyzer 32, 34 and each of the flow cells 33C, 33G, 35C, 36C, 37C is designed to have band broadening of less than one, two, five, ten, fifteen, twenty or twenty-five microliters.

Concentration of the sample fraction 12A-12D is a secondary thing. The temporal sample fractions 12A-12D go through band-broadening as they flow through the conduits and the analyzer assembly 24 and the time dependent concentration actually varies. Each analyzer 32, 34 and each of the flow cells 33C, 33G, 35C, 36C, 37C is designed so that the combined mass or concentration of each sample fraction 12A-12D will stay substantially constant.

Besides low band-broadening, there are two other significant requirements for the MIR analyzers 34A, 34B, 34C. First, the time that a sample fraction 12A-12D remains in the MIR flow cell 35C, 36C, 37C can vary between a fraction of a second, to tens of seconds. Therefore, the MIR analyzers 34A-34C must be able to acquire the entire spectrum on a time scale less than this. Second, the MIR analyzers 34A must have adequate sensitivities with this real time update. Sample concentrations are on the order of one to ten g/L, but the liquid chromatography analyzers typical have a dilution factor of ten to one hundred. This means that sensitivities of better than ten mg/L are required.

As provided herein, in certain embodiments, each MIR analyzer 34A-34C is designed to achieve the following specifications: (i) fast time resolution (typically 10 Hz to 0.1 Hz data rate); (ii) low sample volume (e.g. multi-angle light scattering ("MALS") seventy microliters, Refractive index ("RI") four hundred and twenty-one microliters; (iii) Low band broadening (e.g. RI<20 uL); (v) Flow cell pressure (e.g. UV 40 bar, RI 2 bar); (v) high sensitivity: (a) ten g/L injection, factor of ten to one dilution; (b) need to measure one hundred mg/L with >ten to one (10:1) signal to noise ratio; (c) equal to or less than ten (≤10) mg/L sensitivity; (vii) good spectral coverage; and (viii) good linear dynamic range (up to twenty g/L). Thus, the MIR analyzer 34A-34C provides a wide dynamic range and sensitivity necessary for measuring sample fractions at expected concentrations.

Figure 2A:
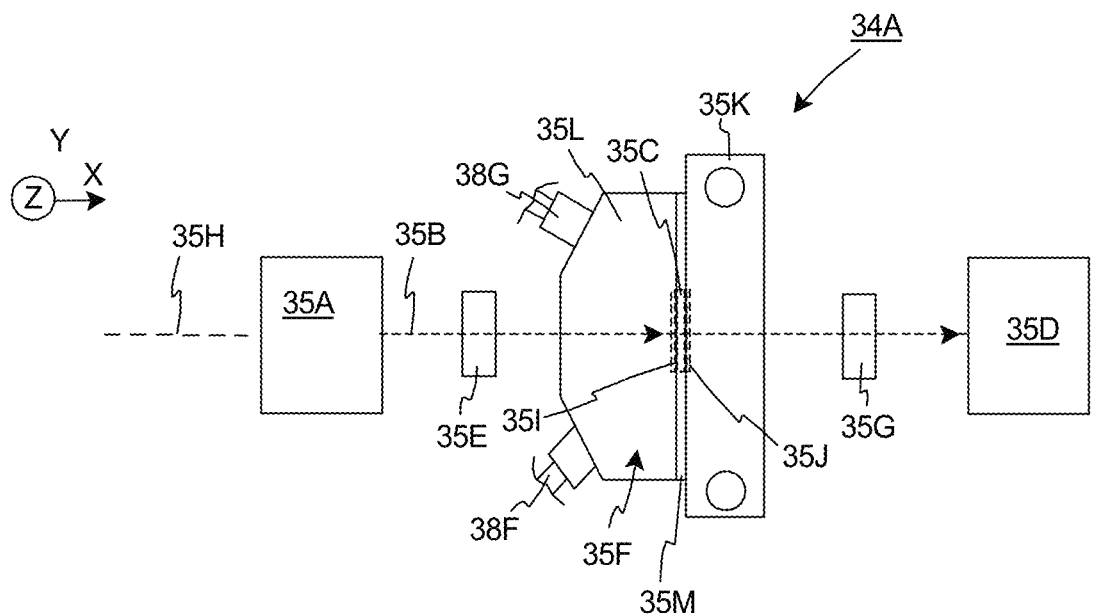
FIG. 2A is simplified illustration of a MIR analyzer.

FIG. 2A is a simplified top schematic of the first MIR analyzer 34A. It should be noted that the second and third MIR analyzers 34B, 34C (illustrated in FIG. 1A) can be somewhat similar in design to the first MIR analyzer 34A. In FIG. 2A, the first MIR analyzer 34A is a laser spectrometer that includes the first MIR laser source 35A, an illumination lens assembly 35E, a flow cell assembly 35F that defines the first MIR flow cell 35C, an output lens assembly 35G, and the first MIR detector 35D. In FIG. 2A, the first MIR laser source 35A generates the first MIR laser beam 35B that passes through an illumination lens assembly 35 and is directed at the flowing sample 12 (not shown in FIG. 2A) in the flow cell assembly 35F. Subsequently, the beam transmitted through the sample 12 in the MIR flow cell 35C is collected by and passes through the output lens assembly 35G, and is directed at the first MIR detector 35D.

The first MIR laser source 35A generates the first MIR laser beam 35B along a beam axis 35H through the MIR flow cell 35C to interrogate the flowing sample 12. As a non-exclusive example, the first MIR laser source 35A can be a tunable MIR light source that directly generates and emits the substantially temporally coherent first MIR laser beam 35B that has a center wavelength that is in the MIR range. For example, the first MIR laser source 35A can be an external cavity, Littrow configuration, tunable laser that directly generates the first MIR laser beam 35B. In this embodiment, the first MIR laser source 35A can be tuned to different first center wavenumbers in the first MIR spectral range over time to interrogate each sample fraction 12A-12D (illustrated in FIG. 1A) at different wavenumbers.

As alternative, non-exclusive examples, the first MIR laser source 35A is designed so that the first MIR laser beam 35B has an optical power of at least one, ten, twenty, fifty or one-hundred milli-Watts.

As a non-exclusive example, the first MIR laser source 35A can include a Quantum Cascade gain medium (not shown) and a wavelength selective feedback element (not shown)(e.g. a diffraction grating and an actuator that rapidly moves the grating) that can be rapidly adjusted to rapidly select (tune) the center wavelength of the MIR laser beam 35B in a closed loop fashion. With this design, the control and analysis system 30 (illustrated in FIG. 1A) can control the current to the gain medium and the position of the wavelength selective feedback element to control the first center wavenumber of the MIR laser beam 35B and rapidly modulate the first center wavenumber over the first MIR spectral range.

The quantum cascade gain medium provides broad spectral tuning, such that one device can cover a spectral region that is significant for measuring chemicals of interest. Further, quantum cascade gain media can be tuned extremely fast, with spectral sweeps at up to one hundred hertz possible. This satisfies the speed requirements for measuring sample fractions.

Further, the intensity of the quantum cascade gain medium allows for longer path lengths through the sample 12. For example, path lengths of one hundred, one hundred and fifty, and two hundred micrometers (100, 150, and 200 μm) are possible in aqueous solutions, a factor of ten greater than for FTIR spectrometers. This in turn allows chemical sensitivity levels of ten mg/L or less.

Moreover, the quantum cascade gain medium can provide a tightly focused MIR laser beam 35B (e.g. less than 0.1 centimeters) so that relatively small (e.g. less than 0.5, 1.0, 1.5, or 2.0 millimeter) transmission windows 35I, 35J can be used in the flow cell 35C. This in turn allows for the use of very small volume flow cells 35C (e.g. total internal volume of less than one, two, five, or ten microliters) with band broadening of twenty microliters or less.

The design of the illumination lens assembly 35E and the output lens assembly 35G can be varied to suit the wavelength of the MIR laser beam 35B. For example, the illumination lens assembly 35E and/or the output lens assembly 35G can each include one or more lens made out materials that are operable in the mid-infrared range. For example, the illumination lens assembly 35E and/or the output lens assembly 35 can include one or more lenses made of germanium. However, other materials may also be utilized.

The design of the first MIR detector 35D can be varied to suit the wavelength of the first MIR laser beam 35. As non-exclusive examples, the first MIR detector assembly 35D can be a single element point detector, or a two dimensional array of sensors, such as a thermoelectrically cooled, photoconductive, InAsSb (indium arsenide antimonide) detector. Alternatively, another type of optical detector assembly 248 can be utilized.

The first MIR detector 35D generates the information for the first MIR temporal data and the first MIR spectral data. For example, in one embodiment, the first MIR detector assembly 35D can measure absorbance as a function of time to generate the first MIR temporal data. Subsequently, with information regarding current to the gain medium and the position of the wavelength selective feedback element, the center wavenumber of first MIR laser beam 35B relative to time can be determined. This information can be used with the first MIR temporal data to generate the first MIR wavenumber data. Subsequently, the first MIR wavenumber data can be normalized with background absorption information to generate the first MIR spectral data for each sample fraction 12A-12D.

The flow cell assembly 35F defines the first MIR flow cell 35C. As provided above, the flow cell assembly 35F is designed so that the first flow cell 35C has a small volume to inhibit band broadening of the sample 12 and preserve the quality of the sample 12.

FIG. 2B is a cut-away view of a portion of the flow cell assembly 35F analyzer of FIG. 2A, and FIG. 2C is an enlarged view from FIG. 2B.

With reference to FIGS. 2A-2C, in one, non-exclusive embodiment, the flow cell assembly 35F includes a base 35K, a cap 35L, a gasket 35M, and a fastener assembly 35N that secures the base 35K to the cap 35L with the gasket 35M therebetween. The size, shape and design of each of these components can be varied according to the teachings provided herein.

The base 35K is rigid and includes the output transmission window 35J, and a base aperture 35O that extends transversely. In this embodiment, the base aperture 35O is aligned with the output transmission window 35J along the beam axis 35H.

The cap 35L is rigid and includes the input transmission window 35I, and a cap aperture 35P that extends transversely. In this embodiment, the cap aperture 35P is aligned with the input transmission window 35I along the beam axis 35H.

Each window 35I, 35J can be made of AR coated diamond (or other suitable material) and is relatively small. Alternatively, for example, one or both windows 35I, 35J can be made from other mid-infrared transmissive materials, even polymers and plastics. In one non-exclusive embodiment, each window 35I, 35J can be square shaped and can have a width of approximately three millimeters, a length of approximately three millimeters, and a thickness of approximately 0.3 millimeters.

The conduit 38F delivers the sample 12 (illustrated in FIG. 1A) to the flow cell 35F, and the conduit 38G allows for the sample 12 to exit the flow cell assembly 35F. In one embodiment, the conduits 38F, 38G are in fluid communication with the cap 35L and extend into the cap 35L. For example, each conduit 35F, 35G can include a flexible fluid tube 38L that is secured to the cap 35L using a fitting 38M, e.g. a zero volume fitting, that is threaded directly into the cap 35L. In one embodiment, the conduit 38F, 38G are at an angle relative to the beam axis 35H.

Further, in this embodiment, the cap 35L includes an inlet passageway 35Q that extends into the flow cell 35C that allows the sample 12 to be directed into the flow cell 35C; and an outlet passageway 35R that extends through the cap 35L into the flow cell chamber 35C to allow the sample 12 to exit the flow cell 35C. Moreover, in one embodiment, each passageway 35Q, 35R is an angle relative to the beam axis 35H.

In the embodiment illustrated in the Figures, the conduit 38F is threaded into the cap 35L near the inlet passageway 35Q, and the outlet conduit 38G is threaded into the cap 35L near the outlet passageway 36R. In one embodiment, (i) the inlet conduit 38F has an inlet conduit cross-sectional area; (ii) the outlet conduit 38G has an outlet conduit cross-sectional area; (iii) the inlet passageway 35Q has an inlet passageway cross-sectional area; (iv) the outlet passageway 35R has an outlet passageway cross-sectional area; and (v) the flow cell 35C has a chamber cross-sectional area. In one embodiment, the chamber cross-sectional area is approximately equal to one or more (e.g. all) of (i) the inlet conduit cross-sectional area; (ii) the outlet conduit cross-sectional area; (iii) the inlet passageway cross-sectional area; (iv) the outlet passageway cross-sectional area. In alternative, non-exclusive examples, the chamber cross-sectional area is within approximately 1, 2, 5, 10, 20, 25, 50, 75, 100, 200, or 500 percent, of one or more (e.g. all) of (i) the inlet conduit cross-sectional area; (ii) the outlet conduit cross-sectional area; (iii) the inlet passageway cross-sectional area; (iv) the outlet passageway cross-sectional area. This minimizes dead volume and mixing of the sample 12 during the analysis in the flow cell 35C.

Stated in a different fashion, as alternative, non-exclusive examples, the flow cell 35C can be generally rectangular shaped and can have a chamber cross-section area that is approximately 1, 2, 5, 10, 20, 25, 50, 75, 100, 200, or 500 percent of the inlet conduit cross-sectional area and the inlet passageway cross-sectional area.

The gasket 35M is secured to and positioned between the base 35K and the cap 35L. Further, the gasket 35M, the base 35K, and the cap 35L cooperate to define the flow cell 35C. Further, the window 35I, 35J define a portion the flow cell 35C, and are positioned on opposite sides of the flow cell 35C.

In one embodiment, the gasket 35M includes a gasket body having a gasket opening 35S. The gasket 35M can be made of a resilient material to form a seal between the base 35K and the cap 35L, and seal between the windows 35I, 35J to define the flow cell 35C. Non-exclusive examples of suitable materials for the gasket 35M include Teflon (PTFE), rubber (Viton), metals (e.g. copper), or other plastic and rubber polymers.

In one non-exclusive embodiment, the gasket body is generally rectangular shaped, has a gasket thickness, and the gasket opening 35S has an opening length, and an opening width. As a non-exclusive example, the gasket opening 35S is rectangular shaped and has an opening length of approximately 4.75 millimeters, and an opening width of approximately 1.01 millimeters, and the gasket thickness is approximately 0.15 millimeters. Alternatively, (i) one or more of the opening length, opening width, and gasket thickness can be changed to change the volume of the flow cell 35C; (ii) one or more of the opening width, and gasket thickness can be changed to change the cross-sectional area of the flow cell 35C; and (iii) the gasket thickness can be changed to change a path length of the light through the flow cell 35C. Thus, the gasket 35M can be designed to achieve the desired volume, cross-sectional area, and path length of the flow cell 35C.

As non-exclusive embodiments, the gasket thickness can be approximately 0.01, 0.025, 0.05, 0.075, 0.1, 0.125, 0.15, 0.2, 0.5, 1.0, 1.5, 2, 2.2, 2.4, 2.5, or 3 millimeters.

In certain embodiments, the path length of the beam through the flow cell 35C between the windows 35I, 35J is defined by the gasket thickness. Alternative, non-exclusive embodiments, the path length can be approximately 0.01, 0.025, 0.05, 0.075, 0.1, 0.125, 0.15, 0.2, 0.5, 1.0, 1.5, 2, 2.2, 2.4, 2.5, or 3 millimeters. With this design, the gasket thickness can be changed to change the path length.

Further, the size and shape of the gasket opening 35S can be changed to adjust the cell cross-sectional area of the flow cell 35C, and a volume of the flow cell 35C.

The fastener assembly 35N selectively attaches the cap 35L to the base 35K with the gasket 35M therebetween and with the windows 35I, 35J aligned along the beam axis 35H and spaced apart the path length through the flow cell 35C. In one embodiment, fastener assembly 35N includes a pair of threaded bolts. However, other types of fasteners can be utilized.

Figure 3A:
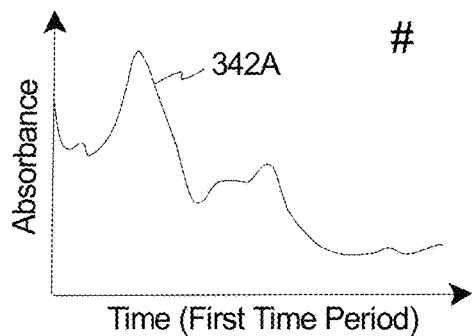
FIGS. 3A-3D are alternative graphs that illustrate MIR temporal data generated when four different sample fractions are analyzed with a first MIR analyzer over time.
Figure 3B:
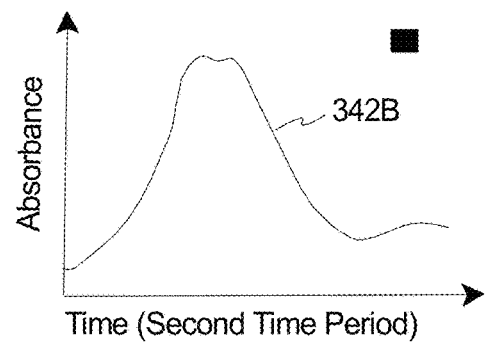

FIG. 3A is a graph that plots combined absorbance (as measured by the first MIR detector 35D illustrated in FIG. 1A) versus time, and this time-response plot illustrates the first MIR temporal data 342A collected by the first MIR analyzer 34A (illustrated in FIG. 1A) during a first time period when the first sample fraction 12A (#) passed through the first MIR analyzer 34A. This first MIR temporal data 342A can be used to identify the first sample fraction 12A. Similarly, FIG. 3B is a graph that plots combined absorbance (as measured by the first MIR detector 35D illustrated in FIG. 1A) versus time, and this time-response plot illustrates the second MIR temporal data 342B collected by the first MIR analyzer 34A (illustrated in FIG. 1A) during a second time period when the second sample fraction 12B (small squares) passed through the first MIR analyzer 34A. This second MIR temporal data 342B can be used to identify the second sample fraction 12B.

Figure 3C:
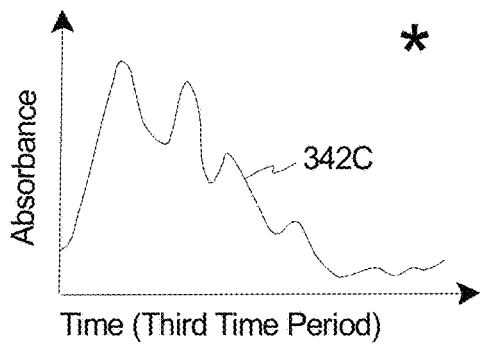

Further, FIG. 3C is a graph that plots combined absorbance (as measured by the first MIR detector 35D illustrated in FIG. 1A) versus time, and this time-response plot illustrates the third MIR temporal data 342C collected by the first MIR analyzer 34A (illustrated in FIG. 1A) during a third time period when the third sample fraction 12C (*) passed through the first MIR analyzer 34A. This third MIR temporal data 342C can be used to identify the third sample fraction.

Figure 3D:
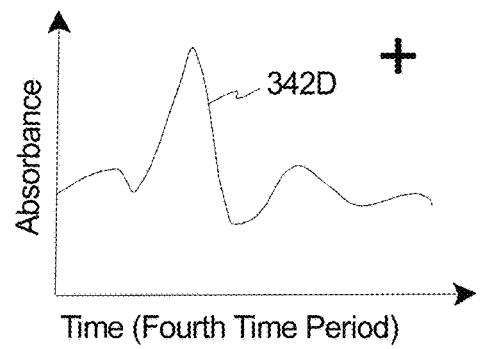

Moreover, FIG. 3D is a graph that plots combined absorbance (as measured by the first MIR detector 35D illustrated in FIG. 1A) versus time, and this time-response plot illustrates the fourth MIR temporal data 342D collected by the first MIR analyzer 34 (illustrated in FIG. 1A) during a fourth time period when the fourth sample fraction 12D (+) passed through the first MIR analyzer 34A. This fourth MIR temporal data 342D can be used to identify the fourth sample fraction.

It should be noted that a separate MIR temporal data (time-response plot) can be collected by each of the MIR analyzers 34A-34C for each of the sample fractions 12A-12D.

Figure 3E:
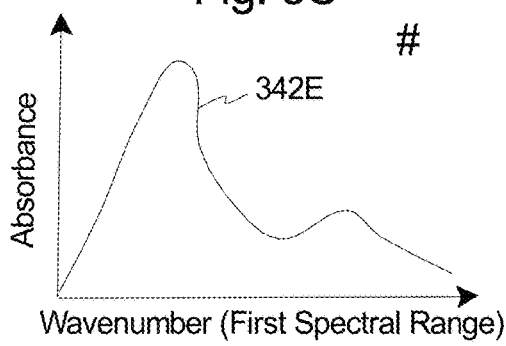
FIGS. 3E-3H are alternative graphs that illustrate MIR wavenumber data from when different the sample fractions are analyzed with the first MIR analyzer over time.

FIG. 3E is a graph of a first MIR wavenumber data 342E that plots absorbance versus wavenumber during the first time period when the first sample fraction 12A (#) passed through the first MIR analyzer 34A. The control and analysis system 30 can use the information regarding current to the first MIR laser source 35A (illustrated in FIG. 1A), and the position of the wavelength selective feedback element during the first time period to determine the center wavenumber of first MIR laser beam 35B over time during the first time period. With this information, the first MIR wavenumber data 342E can be generated by using (i) the MIR temporal data 342A (illustrated in FIG. 3A) during the first time period when the first sample fraction 12A (#) passed through the first MIR analyzer 34A; and (ii) the information of how the center wavenumber varies during the first time period. This first MIR wavenumber data 342E can be used to identify the first sample fraction 12A.

Figure 3F:
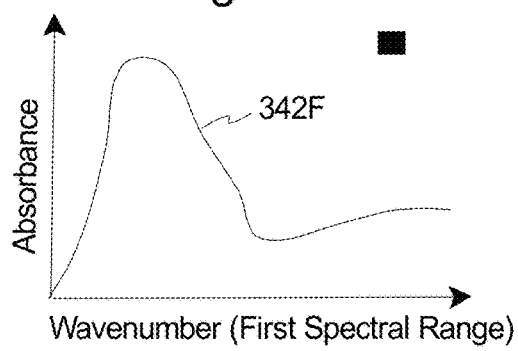

Similarly, FIG. 3F is a graph of a second MIR wavenumber data 342F that plots absorbance versus wavenumber during the second time period when the second sample fraction 12B (small squares) passed through the first MIR analyzer 34A. The control and analysis system 30 can use the information regarding current to the first MIR laser source 35A (illustrated in FIG. 1A), and the position of the wavelength selective feedback element during the second time period to determine the center wavenumber of first MIR laser beam 35B over time during the second time period. With this information, the second MIR wavenumber data 342F can be generated by using (i) the second MIR temporal data 342B (illustrated in FIG. 3B) during the second time period when the second sample fraction 12B passed through the first MIR analyzer 34A; and (ii) the information of how the center wavenumber varies during the second time period. This MIR wavenumber data 342F can be used to identify the second sample fraction 12B.

Figure 3G:
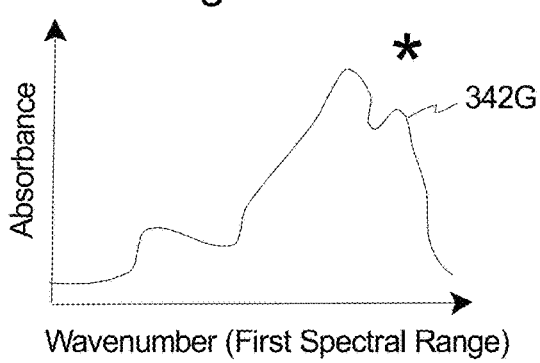

Further, FIG. 3G is a graph of a third MIR wavenumber data 342G that plots absorbance versus wavenumber during the third time period when the third sample fraction 12C (*) passed through the first MIR analyzer 34A. The control and analysis system 30 can use the information regarding current to the first MIR laser source 35A (illustrated in FIG. 1A), and the position of the wavelength selective feedback element during the third time period to determine what the center wavenumber of first MIR laser beam 35B is over time during the third time period. With this information, the third MIR wavenumber data 342G can be generated by using (i) the third MIR temporal data 342C (illustrated in FIG. 3C) during the third time period when the third sample fraction 12C passed through the first MIR analyzer 34A; and (ii) the information of how the center wavenumber varies during the third time period. The third MIR wavenumber data 342G can be used to identify the third sample fraction 12C.

Figure 3H:
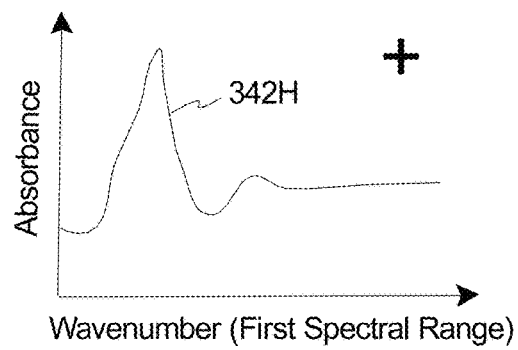

Moreover, FIG. 3H is a graph of a fourth MIR wavenumber data 342H that plots absorbance versus wavenumber during the fourth time period when the fourth sample fraction 12D (+) passed through the first MIR analyzer 34A. The control and analysis system 30 can use the information regarding current to the first MIR laser source 35A (illustrated in FIG. 1A), and the position of the wavelength selective feedback element during the fourth time period to determine what the center wavenumber of first MIR laser beam 35B is over time during the fourth time period. With this information, the fourth MIR wavenumber data 342G can be generated by using (i) the fourth MIR temporal data 342D during the fourth time period when the fourth sample fraction 12D passed through the first MIR analyzer 34A; and (ii) the information of how the center wavenumber varies during the fourth time period. The fourth MIR wavenumber data 342H can be used to identify the fourth sample fraction 12D.

It should be noted that a separate MIR wavenumber data (wavenumber-response plot) can be generated for each of the MIR analyzers 34A-34C for each of the sample fractions 12A-12D.

Figure 4A:
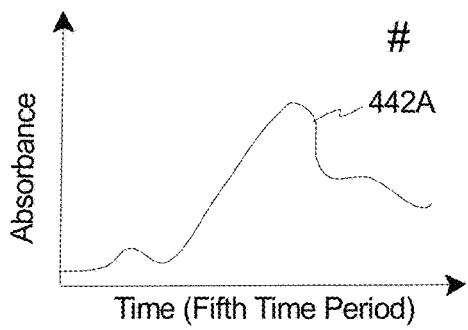
FIGS. 4A-4D are alternative graphs that illustrate MIR temporal data generated when four different sample fractions are analyzed with a second MIR analyzer over time.

FIG. 4A is a graph that plots combined absorbance (as measured by the second MIR detector 36D illustrated in FIG. 1A) versus time, and this time-response plot illustrates the fifth MIR temporal data 442A collected by the second MIR analyzer 34B (illustrated in FIG. 1A) during a fifth time period when the first sample fraction 12A (#) passed through the second MIR analyzer 34B. This fifth MIR temporal data 442A can be used to identify the first sample fraction 12A.

Figure 4B:
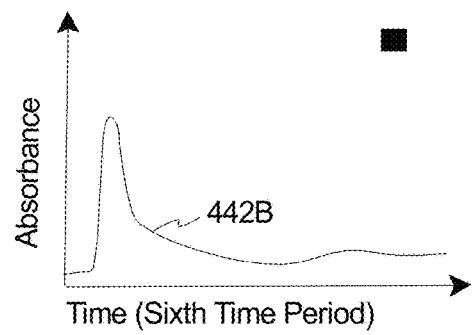

Similarly, FIG. 4B is a graph that plots combined absorbance (as measured by the second MIR detector 36D illustrated in FIG. 1A) versus time, and this time-response plot illustrates the sixth MIR temporal data 442B collected by the second MIR analyzer 34B (illustrated in FIG. 1A) during a sixth time period when the second sample fraction 12B (small squares) passed through the second MIR analyzer 34B. This sixth MIR temporal data 442B can be used to identify the second sample fraction 12B.

Figure 4C:
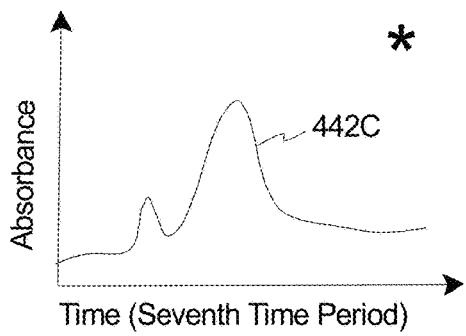

Further, FIG. 4C is a graph that plots combined absorbance (as measured by the second MIR detector 36D illustrated in FIG. 1A) versus time, and this time-response plot illustrates the seventh MIR temporal data 442C collected by the second MIR analyzer 34B (illustrated in FIG. 1A) during a seventh time period when the third sample fraction 12C (*) passed through the second MIR analyzer 34B. This seventh MIR temporal data 442C can be used to identify the third sample fraction 12C.

Figure 4D:
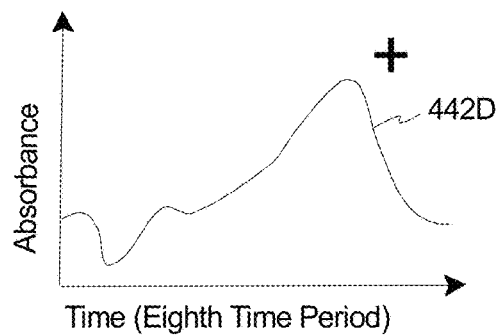

Moreover, FIG. 4D is a graph that plots combined absorbance (as measured by the second MIR detector 36D illustrated in FIG. 1A) versus time, and this time-response plot illustrates the eighth MIR temporal data 442D collected by the second MIR analyzer 34B (illustrated in FIG. 1A) during an eighth time period when the fourth sample fraction 12D (+) passed through the second MIR analyzer 34A. This fourth MIR temporal data 442D can be used to identify the fourth sample fraction.

Figure 4E:
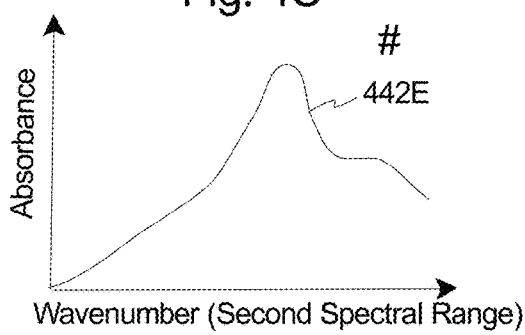
FIGS. 4E-4H are alternative graphs that illustrate MIR wavenumber data from when different the sample fractions are analyzed with the second MIR analyzer over time.

FIG. 4E is a graph of a fifth MIR wavenumber data 442E that plots absorbance versus wavenumber during the fifth time period when the first sample fraction 12A (#) passed through the second MIR analyzer 34B. The control and analysis system 30 can use the information regarding current to the second MIR laser source 36A (illustrated in FIG. 1A), and the position of the wavelength selective feedback element during the fifth time period to determine the center wavenumber of second MIR laser beam 36B over time during the second time period. With this information, the fifth MIR wavenumber data 442E can be generated by using (i) the MIR temporal data 442A (illustrated in FIG. 4A) during the fifth time period when the first sample fraction 12A (#) passed through the second MIR analyzer 34B; and (ii) the information of how the center wavenumber varies during the fifth time period. This fifth MIR wavenumber data 442E can be used to identify the first sample fraction 12A.

Figure 4F:
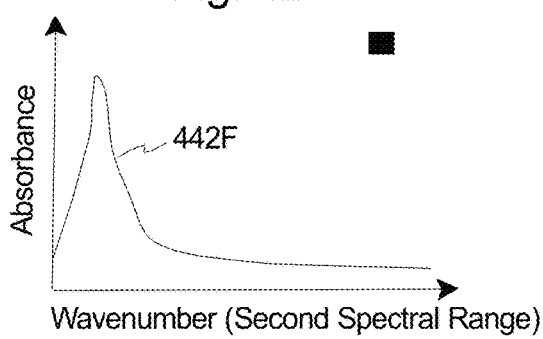

Similarly, FIG. 4F is a graph of a sixth MIR wavenumber data 442F that plots absorbance versus wavenumber during the sixth time period when the second sample fraction 12B (small squares) passed through the second MIR analyzer 34B. The control and analysis system 30 can use the information regarding current, and the position of the wavelength selective feedback element during the sixth time period to determine the center wavenumber of second MIR laser beam 36B over time during the sixth time period. With this information, the sixth MIR wavenumber data 442F can be generated by using (i) the sixth MIR temporal data 442B (illustrated in FIG. 4B) during the sixth time period when the second sample fraction 12B passed through the second MIR analyzer 34B; and (ii) the information of how the center wavenumber varies during the sixth time period. The sixth MIR wavenumber data 442F can be used to identify the second sample fraction 12B.

Figure 4G:
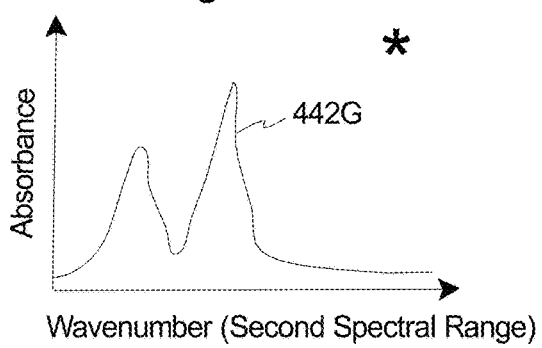
Figure 4H:
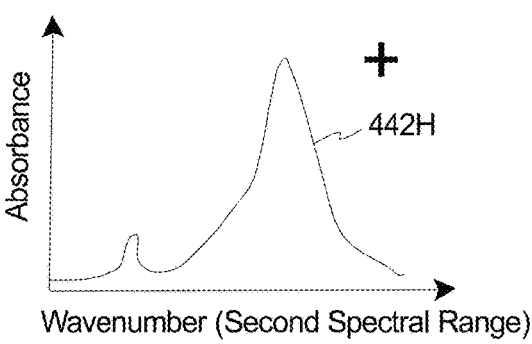

Further, FIG. 4G is a graph of a seventh MIR wavenumber data 442G that plots absorbance versus wavenumber during the seventh time period when the third sample fraction 12C (*) passed through the second MIR analyzer 34B. The control and analysis system 30 can use the information regarding current, and the position of the wavelength selective feedback element during the seventh time period to determine what the center wavenumber of second MIR laser beam 36B is over time during the seventh time period. With this information, the seventh MIR wavenumber data 442G can be generated by using (i) the seventh MIR temporal data 442C (illustrated in FIG. 4C) during the seventh time period when the third sample fraction 12C passed through the second MIR analyzer 34B; and (ii) the information of how the center wavenumber varies during the seventh time period. The seventh MIR wavenumber data 442G can be used to identify the third sample fraction 12C.

Moreover, FIG. 3H is a graph of an eighth MIR wavenumber data 342H that plots absorbance versus wavenumber during the eighth time period when the fourth sample fraction 12D (+) passed through the second MIR analyzer 34B. The control and analysis system 30 can use the information regarding current, and the position of the wavelength selective feedback element during the eighth time period to determine what the center wavenumber of second MIR laser beam 36B is over time. With this information, the eighth MIR wavenumber data 442G can be generated by using (i) the eighth MIR temporal data 442D during the eighth time period when the fourth sample fraction 12D passed through the second MIR analyzer 34B; and (ii) the information of how the center wavenumber varies during the eighth time period. The eighth MIR wavenumber data 442H can be used to identify the fourth sample fraction 12D.

Figure 5:
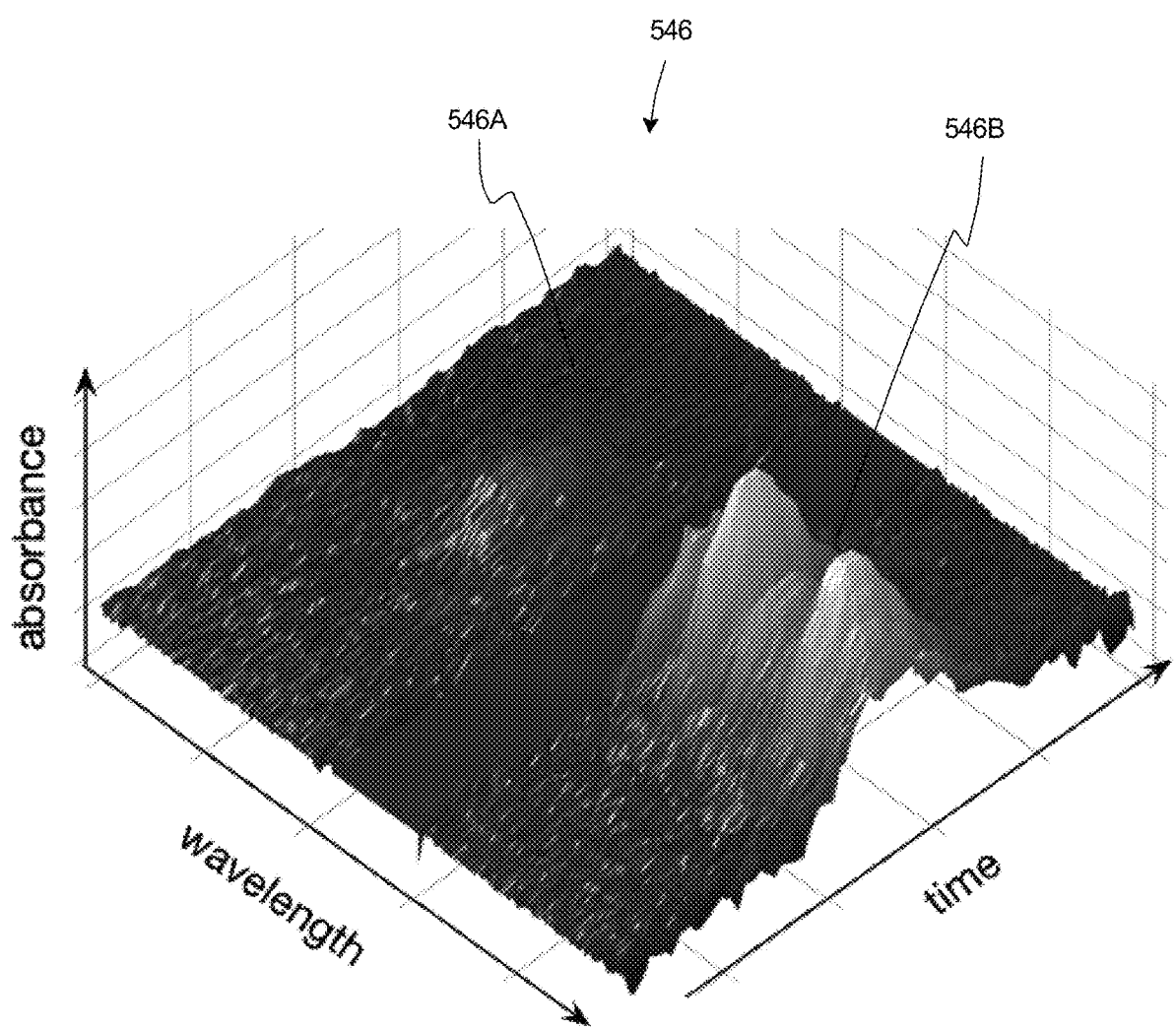
FIG. 5 is a three dimensional surface plot that illustrates a combined MIR spectral data for the first sample fraction as a function of time.

FIG. 5 is a three dimensional surface plot that illustrates the evolution of the MIR spectral data 546 as a function of time for an eluting sample fraction (e.g. the first sample fraction 12A). In this example, the combined MIR spectral data 546 plots normalized absorbance as a function of time and as a function of wavelength (or wavenumber) for a liquid chromatography analyzer system 10 (illustrated in FIG. 1A) having two MIR analyzers 34A, 34B (illustrated in FIG. 1A) arranged in series.

As provided herein, with reference to FIG. 1A, (i) the first MIR analyzer 34A can be modulated over the first MIR spectral range while just the solvent 18 is flowing in the first MIR flow cell 35C to generate a first MIR background temporal data for the first MIR analyzer 34A; and (ii) the second MIR analyzer 34B can be modulated over the second MIR spectral range while just the solvent 18 is flowing in the second MIR flow cell 36C to generate a second MIR background temporal data for the second MIR analyzer 34B.

Next, (i) the first MIR background wavenumber data can be generated using the first MIR background temporal data, and information of how the center wavenumber varied during this time; and (ii) the second MIR background wavenumber data can be generated using the second MIR background temporal data, and information of how the center wavenumber varied during this time.

Subsequently, (i) a first MIR temporal data can collected by the first MIR analyzer 34A during a first time period when the first sample fraction 12A (#) passed through the first MIR analyzer 34A; and (ii) a second MIR temporal data can collected by the second MIR analyzer 34B during a second time period when the first sample fraction 12A (#) passed through the second MIR analyzer 34B.

Next, (i) the first MIR wavenumber data can be generated using the first MIR temporal data, and information of how the center wavenumber varies during the first time period; and (ii) the second MIR wavenumber data can be generated using the second MIR temporal data, and information of how the center wavenumber varies during the second time period.

Subsequently, (i) the first MIR background wavenumber data can be combined with the first MIR wavenumber data to generate the normalized, first MIR spectral data 546A on the left side of the plot; and (ii) the second MIR background wavenumber data can be combined with the second MIR wavenumber data to generate the normalized, second MIR spectral data 546B on the right side of the plot MIR spectral data 546.

The first MIR spectral data 546A and the second MIR spectral data 546B are then combined to generate the normalized, combined (integrated) MIR spectral data 546.

The first MIR spectral data 546A, the second MIR spectral data 546B, or the combined MIR spectral data 546 can be used to identify the first sample fraction 12A.

The steps described above can be performed by the control and analysis system 30.

In FIG. 5, the sample fraction is glutamine, the MIR spectral data and the MIR temporal data from two MIR analyzers 34A, 34B was combined to generate the combined MIR spectral data 546.

It should be noted that in the non-exclusive example illustrated in FIG. 5, there is a gap in the combined MIR spectral data 546 between the first MIR spectral data 546A and the second MIR spectral data 546B. This gap is a result of a gap between the first MIR spectral range used by the first MIR analyzer 34A and the second MIR spectral range used by the second MIR analyzer 34B. Alternatively, there would not be a gap if the first MIR spectral range partly overlapped the second MIR spectral range.

It should also be noted that in FIG. 5, to generate the combined MIR spectral data 546, the second MIR spectral data 546B was shifted in time to align with the first MIR spectral data 546A. More specifically, as provided above, the first sample fraction 12A flows from the first MIR analyzer 34A to the second MIR analyzer 34B. Thus, a delay time exists between when the first sample 12A flows through the first MIR analyzer 34A and the second MIR analyzer 34B. As provided herein, the control and analysis system 30 determines the delay time, and shifts the second MIR spectral data 546B appropriately in time to align with the first MIR spectral data 546A to generate the combined MIR spectral data 546.

As illustrated in FIG. 5, the present design can be used to create a three dimensional map, with one axis being the temporal arrival of the sample fractions, and at each time slice a MIR spectrum is recorded that provides the other two axes (wavenumber and absorbance). Further, the MIR spectrum is very sensitive to many chemicals such as carbohydrates.

As provided herein, the delay time between adjacent analyzers 32, 34 in series is equivalent to a volume between the analyzers 32, 34 when taking into account the pump speed of the solvent 18. A useful technique used to calculate the delay time is to calculate a combined MIR temporal data for two or more MIR analyzers 34, instead of displaying the entire spectrum. As provided herein, the combined MIR temporal data from two of more MIR analyzers 34 can be compared to the non-MIR temporal data from the non-MIR analyzer 32 for the different eluting sample fractions to estimate the delay time between the analyzers 32, 34 in the system.

Figure 6:
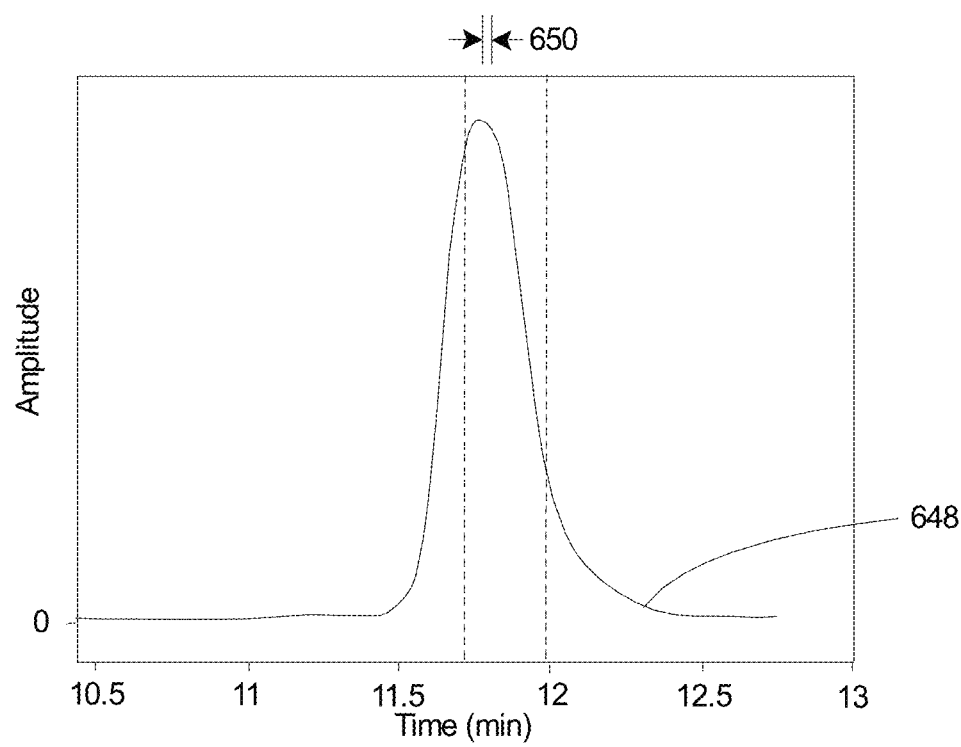
FIG. 6 includes an upper graph that illustrates non-MIR temporal data, and a lower graph that illustrates a combined MIR temporal data for a sample fraction.
Figure 6:
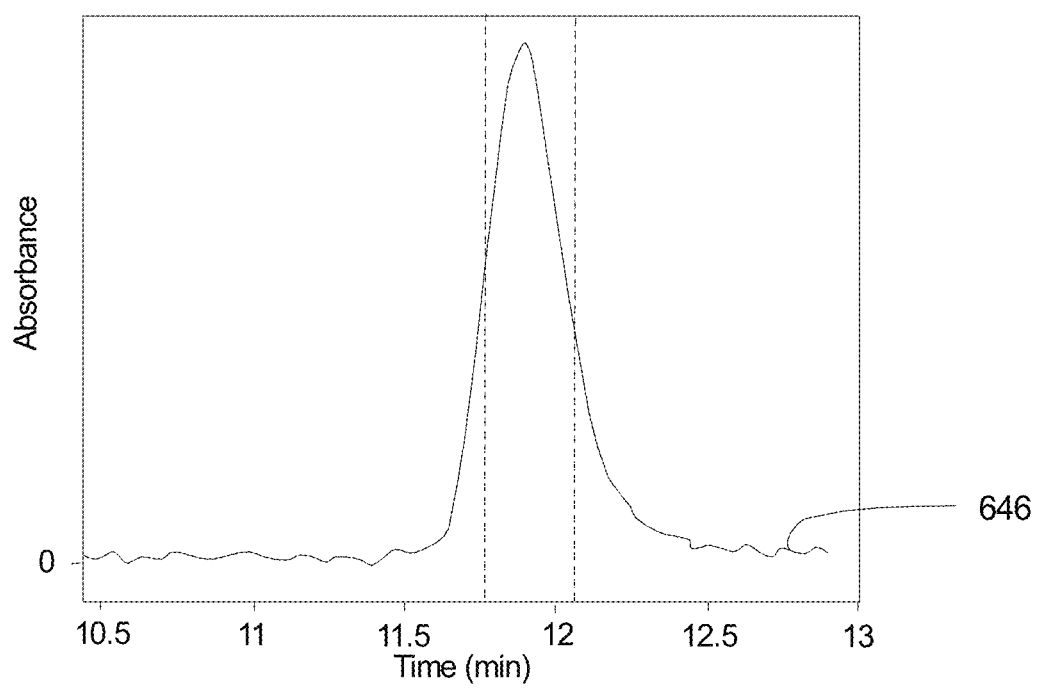

FIG. 6 includes an upper graph that illustrates the non-MIR temporal response 648 of a sample fraction collected by the second non-MIR analyzer 32B. Stated in another fashion, the upper graph of FIG. 6 plots light amplitude (as measured by the second non-MIR detector 32B) versus time as the first sample fraction passes through the second non-MIR detector 32B.

FIG. 6 also includes a lower graph that illustrates a combined MIR temporal data 646 collected by two MIR analyzers 34A, 34B. To generate the lower graph, the first MIR analyzer 34A generates first MIR temporal data (absorbance versus time) when the first sample fraction is in the first MIR analyzer 34A; and the second MIR analyzer 34B generates second MIR temporal data (absorbance versus time) when the first sample fraction is in the second MIR analyzer 34B. The first MIR temporal data and the second MIR temporal data are combined to generate the combined MIR temporal data 646.

For this test, the second non-MIR analyzer 32B is upstream of the MIR analyzers 34A, 34B. As provided herein, a shift 650 between the peaks of the non-MIR temporal data 648 and the combined MIR temporal data 646 can be used to calculate the delay time, and corresponding volume delay between the analyzers such that subsequent data acquisitions can correct for this delay time and line up the response of all instruments on the same time scale. In the same way the delay time and volume can be determined between multiple MIR analyzers to create the combined MIR spectral data.

With this design, the control and analysis system 30 can use the non-MIR temporal data (response) 648 and the combined MIR temporal data (response) 646 to calculate the delay time.

Additionally, the control and analysis system 30 can (i) compare the combined MIR temporal response 646 to the non-MIR temporal response 648 to analyze the sample fractions with improved accuracy; and/or (ii) generate a complete temporal response for each sample fraction using the combined MIR temporal data 646 and the non-MIR temporal data 648.

Figure 7A:
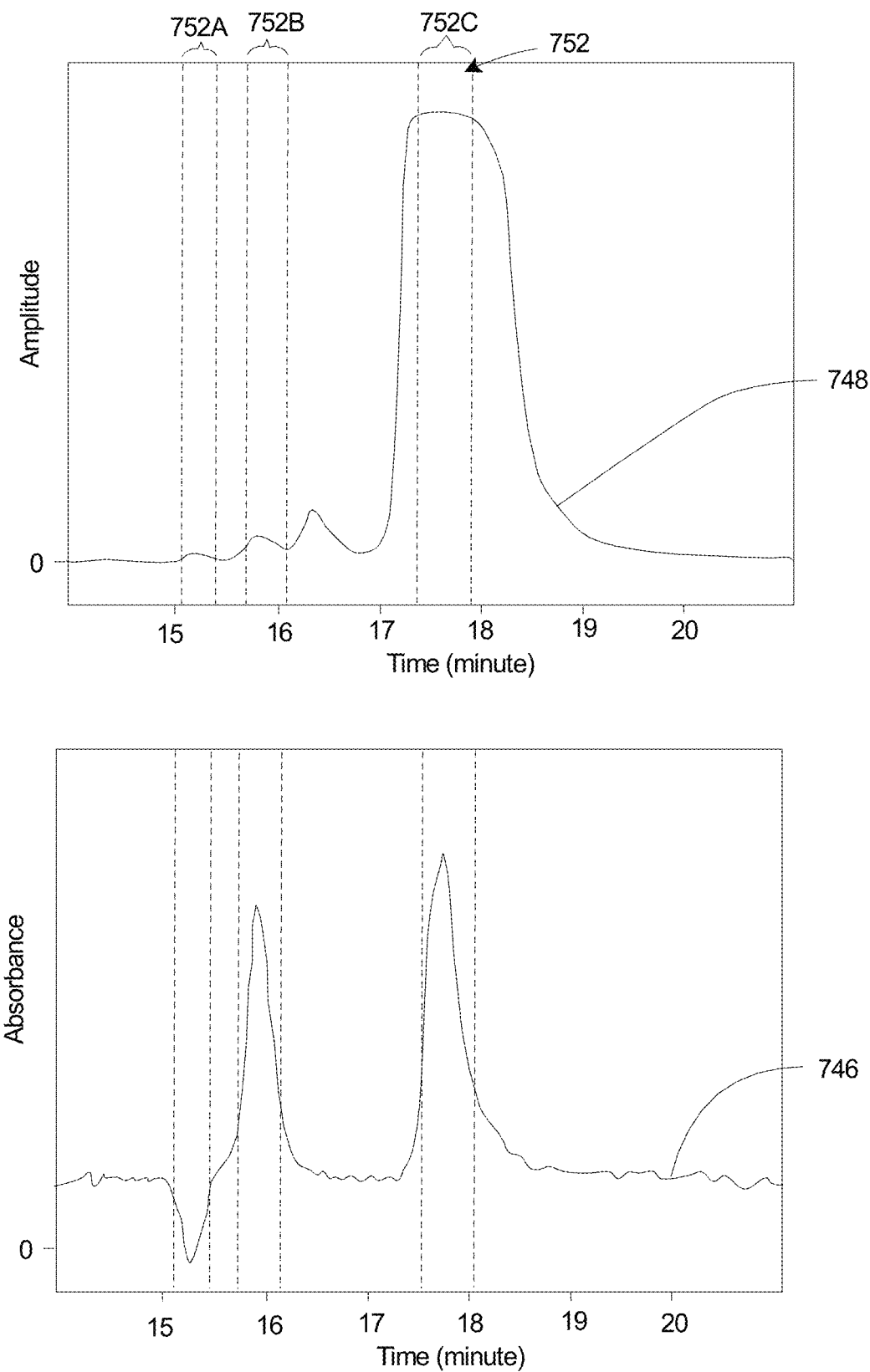
FIG. 7A includes an upper graph that illustrates non-MIR temporal data and a lower graph that illustrates a combined MIR temporal data.

FIG. 7A includes an upper graph that illustrates the non-MIR temporal response 748 of multiple sample fractions collected by one non-MIR analyzer 32. Stated in another fashion, the upper graph of FIG. 7A plots light amplitude (as measured by the non-MIR detector 32) versus time as the multiple sample fractions pass through the non-MIR detector 32.

FIG. 7A also includes a lower graph that illustrates a combined MIR temporal data 746 collected by two MIR analyzers 34A, 34B. To generate the lower graph, the first MIR analyzer 34A generates first MIR temporal data (absorbance versus time) when the plurality of sample fractions flow through the first MIR analyzer 34A; and the second MIR analyzer 34B generates second MIR temporal data (absorbance versus time) when the plurality of sample fractions flow through the second MIR analyzer 34B. The first MIR temporal data and the second MIR temporal data are combined to generate the combined MIR temporal data 746. The combined MIR temporal data 746 has been time adjusted to correct for the delay time.

In this example, the non-MIR temporal data 748 can be compared to the combined MIR temporal data 746 to identify one or more temporal regions of interest 752. In this example, three regions of interest 752, namely a first region of interest 752A, a second region of interest 752B, and a third region of interest 752C (each highlighted and bounded between dashed lines) can be identified comparing the non-MIR temporal response 748 to the combined MIR temporal response 746.

Because the regions of interest are significantly spaced apart in time, each region of interest 752 will correspond to a separate sample fraction. Thus, the first region of interest 752A corresponds to the first sample fraction, the second region of interest 752B corresponds to the second sample fraction, and the third region of interest 752C corresponds to the third sample fraction.

Further, in this example, the first region of interest 752A corresponds to a first time frame, the second region of interest 752B corresponds to a second time frame, and the third region of interest 752C corresponds to a third time frame. Because the graphs have been time adjusted, (i) the first time frame corresponds to the time when the first sample fraction was in the analyzers; (ii) the second time frame corresponds to the time when the second sample fraction was in the analyzers; and (iii) the third time frame corresponds to the time when the third sample fraction was in the analyzers.

With this design, the control and analysis system 30 can use the non-MIR temporal response 748 and the combined MIR temporal response 746 to identify the temporal regions of interest 752. Alternatively, the the non-MIR temporal response 748 and the combined MIR temporal response 746 can be manually reviewed to identify the temporal regions of interest 752.

Subsequently, for example, MIR spectral data (response) can be calculated by the control and analysis system 30 for each region of interest 752. This can be accomplished by averaging the MIR spectra data recorded at each time point in each identified temporal region of interest 752.

Figure 7B:
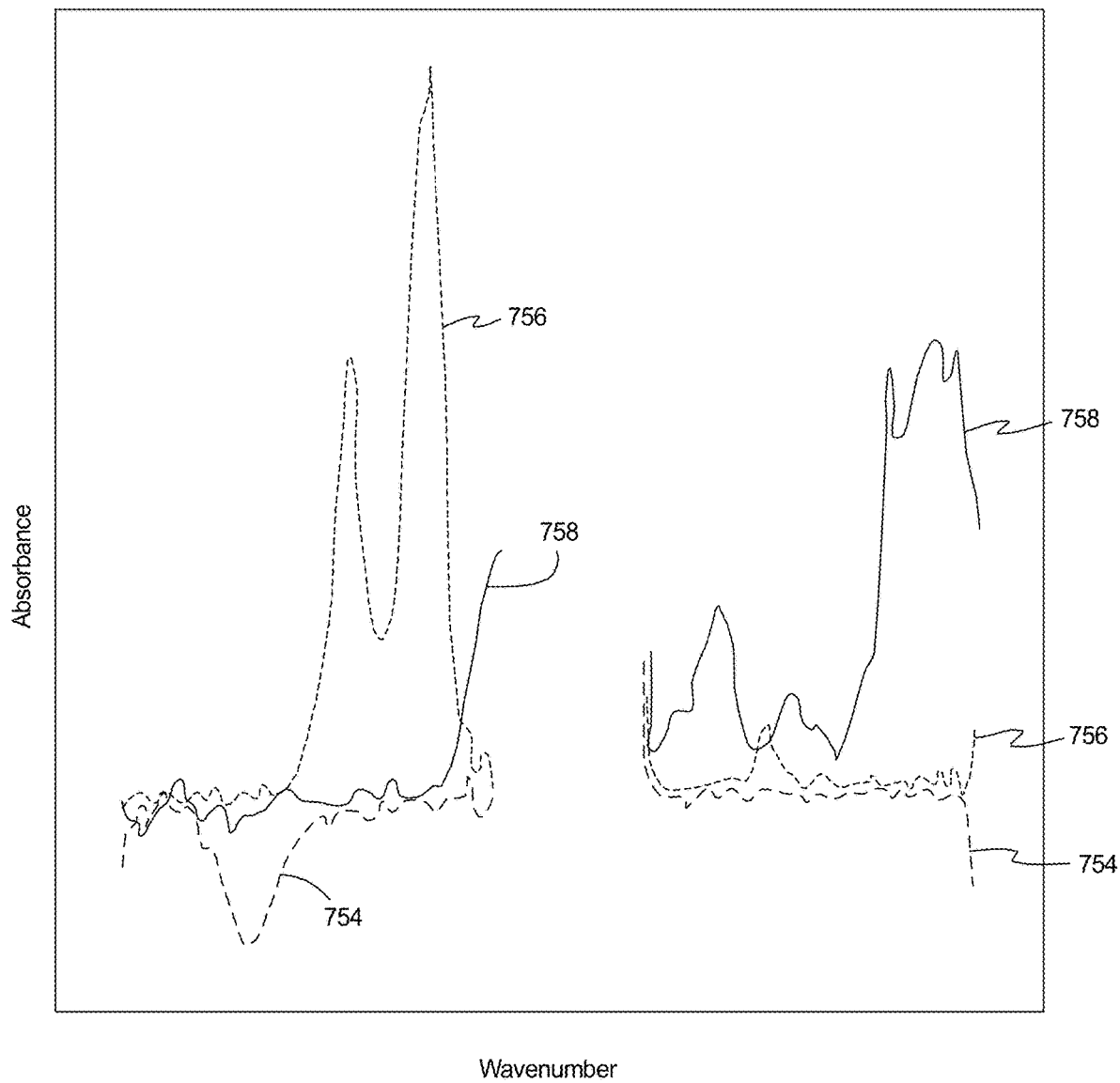
FIG. 7B is graph that illustrates MIR spectral data for a plurality of identified regions of interest.

FIG. 7B is graph that illustrates the MIR spectral data for each of the identified temporal regions of interest from FIG. 7A.

More specifically, (i) a first curve 754A (illustrated with long dashes) represents the combined MIR spectral data (normalized absorbance versus wavenumber) from two MIR analyzers for the first sample fraction that was collected during the first time frame when the first sample fraction was in the MIR analyzers; (ii) a second curve 754B (illustrated with short dashes) represents the combined MIR spectral data (normalized absorbance versus wavenumber) from two MIR analyzers for the second sample fraction that was collected during the second time frame when the second sample fraction was in the MIR analyzers; and (iii) a third curve 754C (illustrated with solid line) represents the combined MIR spectral data (normalized absorbance versus wavenumber) from two MIR analyzers for the third sample fraction that was collected during the third time frame when the third sample fraction was in the MIR analyzers.

In this example, (i) the MIR spectral data from the first curve 754A can be used to identify the first sample fraction or a characteristic thereof; (ii) the MIR spectral data from the second curve 754B can be used to identify the second sample fraction or a characteristic thereof; and (iii) the MIR spectral data from the third curve 754C can be used to identify the third sample fraction or a characteristic thereof;

It should be noted that in the non-exclusive example illustrated in FIG. 7B, there is a gap in the combined MIR spectral data in each curve 754A-754C. This gap is a result of a gap between the first MIR spectral range used by the first MIR analyzer (data on the left) and the second MIR spectral range used by the second MIR analyzer (data on the right). Alternatively, there would not be a gap if the first MIR spectral range partly overlapped the second MIR spectral range.

As provided herein, the control and analysis system 30 can analyze the MIR spectral response for each temporal region of interest 752 to accurately identify and analyze the sample fractions.

Figure 8A:
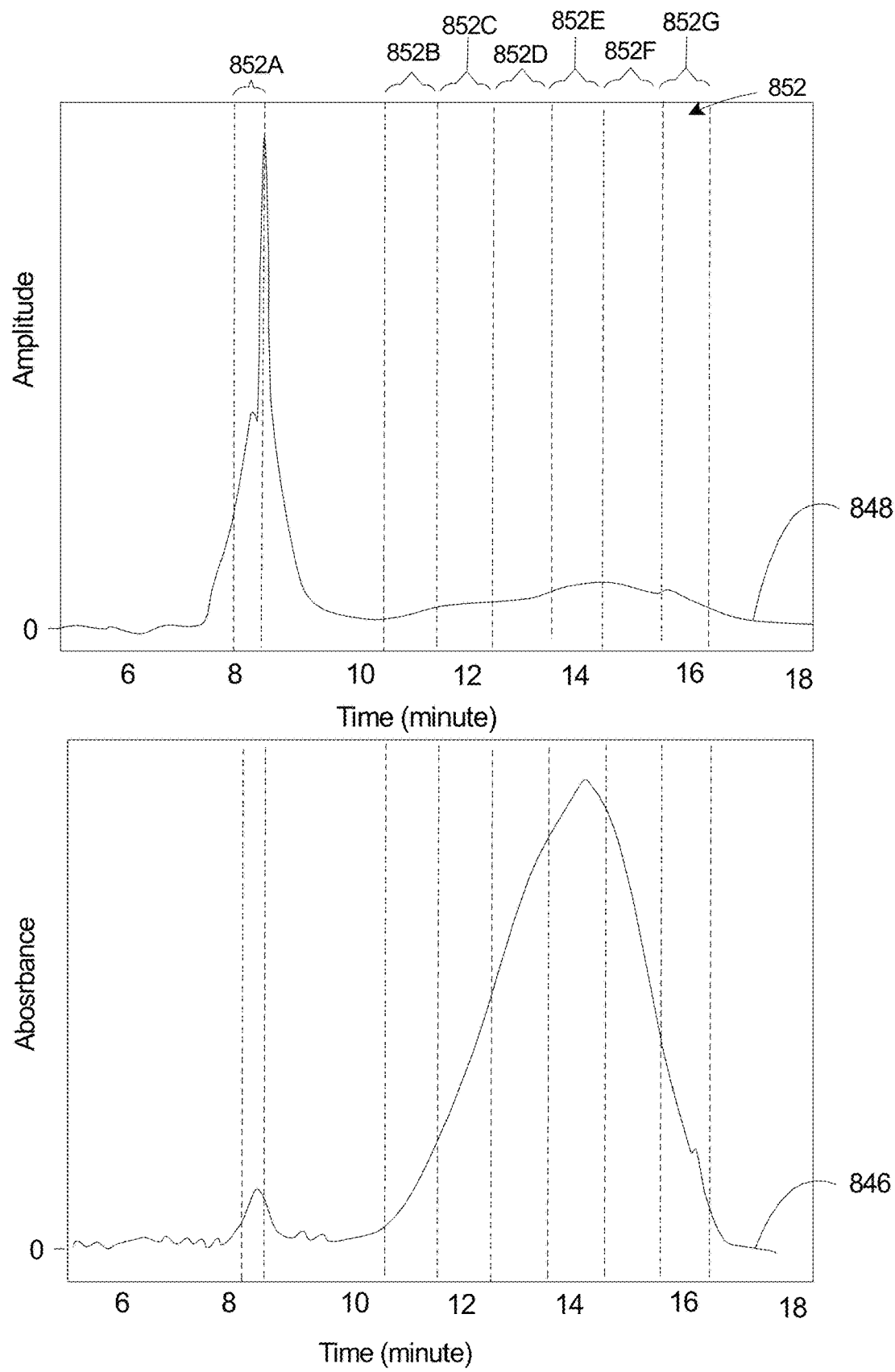
FIG. 8A includes an upper graph that illustrates non-MIR temporal data and a lower graph that illustrates a combined MIR temporal data of a polydisperse sample fraction.

FIG. 8A includes an upper graph that illustrates the non-MIR temporal response 848 of a polydisperse sample fraction that was analyzed with a non-MIR analyzer 32 (e.g. an ultraviolet analyzer). Stated in another fashion, the upper graph of FIG. 8A plots light amplitude (as measured by the non-MIR detector 32) versus time as the polydisperse sample fraction passes through the non-MIR detector 32.

FIG. 8A also includes a lower graph that illustrates a combined MIR temporal data (response) 846 collected by two MIR analyzers 34A, 34B. To generate the lower graph, the first MIR analyzer 34A generates first MIR temporal data (absorbance versus time) when the polydisperse sample fraction flows through the first MIR analyzer 34A; and the second MIR analyzer 34B generates second MIR temporal data (absorbance versus time) when the polydisperse sample fraction flows through the second MIR analyzer 34B. The first MIR temporal data and the second MIR temporal data are combined to generate the combined MIR temporal data 846. The combined MIR temporal data 846 has been time adjusted to correct for the delay time.

In this example, the non-MIR temporal data 848 can be compared to the combined MIR temporal data 846 to identify one or more temporal regions of interest 852 (each highlighted and bounded between dashed lines). In this example, seven regions of interest 852, namely a first region of interest 852A, a second region of interest 852B, a third region of interest 852C, a fourth region of interest 852D, a fifth region of interest 852E, a sixth region of interest 852F, and a seventh region of interest 852G can be identified by evaluating the non-MIR temporal response 848 and the combined MIR temporal response 846.

Because the second through seventh regions of interest 852B-852G are not spaced apart in time, and because there is significant absorbance changes during this time, these regions of interest 852B-852G correspond to the polydisperse sample fraction. In this example, the polydisperse sample fraction does not have distinct sample fractions (e.g. the sample contains a continuum of sizes, for example), but creates a continuous elution with changing chemical composition. Further, because the first region of interest 852A is significantly spaced apart from the other regions of interest 852B-852G, the first region of interest 852A likely corresponds to a separate sample fraction. Stated in another fashion, the first region of interest 852A corresponds to the first sample fraction, the second through seventh regions of interest 852B-852G correspond to the polydisperse sample fraction.

Further, in this example, the first region of interest 852A corresponds to a first time frame, the second region of interest 852B corresponds to a second time frame, the third region of interest 852C corresponds to a third time frame, the fourth region of interest 852D corresponds to a fourth time frame, the fifth region of interest 852E corresponds to a fifth time frame, the sixth region of interest 852F corresponds to a sixth time frame, and the seventh region of interest 852G corresponds to a seventh time frame. Because the graphs have been time adjusted, (i) the first time frame corresponds to the time when the first sample fraction was in the analyzers; and (ii) the second through seventh time frames correspond to the time when the polydisperse sample fraction was in the analyzers.

With this design, the control and analysis system 30 can use the non-MIR temporal response 848 and the combined MIR temporal response 846 to identify the temporal regions of interest 852. Alternatively, the the non-MIR temporal response 848 and the combined MIR temporal response 846 can be manually reviewed to identify the temporal regions of interest 852.

Subsequently, for example, MIR spectral data can be calculated by the control and analysis system 30 for each region of interest 852. This can be accomplished by averaging the MIR spectra data recorded at each time point in each identified temporal region of interest 852. Stated in another fashion, the control and analysis system 30 can calculate the MIR absorbance spectrum for each region of interest 852 by averaging together the individual MIR absorbance spectra at each time slice in the identified temporal region of interest.

Figure 8B:
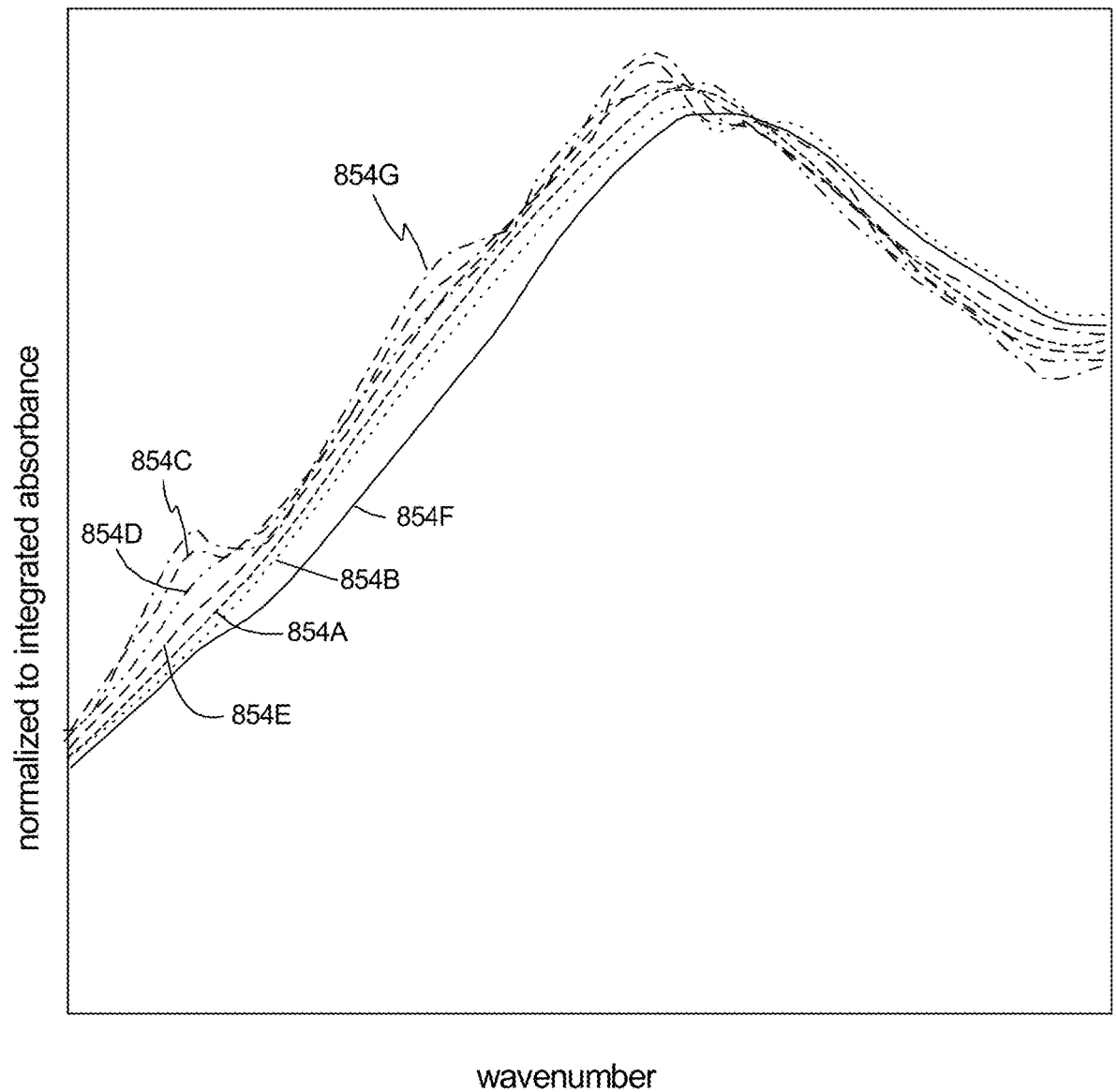
FIG. 8B is graph that illustrates the different infrared spectra for a plurality of identified regions of interest.

FIG. 8B is graph that illustrates the MIR spectral data for each of the identified temporal regions of interest from FIG. 8A. More specifically, (i) a first curve 854A (illustrated with short dashes) represents the combined MIR spectral data (normalized absorbance versus wavenumber) from two MIR analyzers for the first sample fraction that was collected during the first time frame when the first sample fraction was in the MIR analyzers; (ii) a second curve 854B (illustrated with dotted) represents the combined MIR spectral data (normalized absorbance versus wavenumber) from two MIR analyzers for the polydisperse sample fraction that was collected during the second time frame when the polydisperse sample fraction was in the MIR analyzers; (iii) a third curve 854C (illustrated with dash-dotted line) represents the combined MIR spectral data (normalized absorbance versus wavenumber) from two MIR analyzers for the polydisperse sample fraction that was collected during the third time frame when the polydisperse sample fraction was in the MIR analyzers; (iv) a fourth curve 854D (illustrated with dashed-double dotted line) represents the combined MIR spectral data (normalized absorbance versus wavenumber) from two MIR analyzers for the polydisperse sample fraction that was collected during the fourth time frame when the polydisperse sample fraction was in the MIR analyzers; (v) a fifth curve 854E (illustrated with long dashed line) represents the combined MIR spectral data (normalized absorbance versus wavenumber) from two MIR analyzers for the polydisperse sample fraction that was collected during the fifth time frame when the polydisperse sample fraction was in the MIR analyzers; (vi) a sixth curve 854F (illustrated with solid line) represents the combined MIR spectral data (normalized absorbance versus wavenumber) from two MIR analyzers for the polydisperse sample fraction that was collected during the sixth time frame when the polydisperse sample fraction was in the MIR analyzers; and (vii) a seventh curve 854G (illustrated with dash-dotted line) represents the combined MIR spectral data (normalized absorbance versus wavenumber) from two MIR analyzers for the polydisperse sample fraction that was collected during the seventh time frame when the polydisperse sample fraction was in the MIR analyzers.

As provided herein, the control and analysis system 30 can analyze the MIR spectral data 854A-854G for each temporal region of interest 852 to accurately identify and analyze the sample fractions. In this example, the control and analysis system 30 can compare the non-MIR temporal response 848 to the combined MIR temporal response 846 to identify multiple temporal regions of interest 852 in this long elution polydisperse sample fraction, then comparing the mid-infrared spectra, it can be seen how the change in chemical composition of the polydisperse sample fraction can be charted across the elution.

It should be noted that the spectra at left for each region show a shift that is related to changing chemical composition of the polydisperse sample. As provided herein, the differences between the MIR absorbance spectra as a function of elution time and temporal region of interest can be used to accurately identify and analyze the polydisperse sample.

Thus, as provided herein, the control and analysis system 30 can determine temporal regions of interest in a broad sample fraction for a polydisperse sample, and then compare the mid-infrared spectra of these temporal regions to chart chemical changes in the polydisperse sample as a function of elution time.

In certain embodiments, the control and analysis system 30 can estimate a volume of one or more the sample fractions 12A-12D by first measuring the amount of time each sample fraction is present in one or more of the analyzers 32, 34. This can be determined based on the temporal response for the respective analyzer 32, 34. Subsequently, for each sample fraction 12A-12D, the volume can be calculated by the control and analysis system 30 using the amount of time in the analyzer (from the temporal response), and the flow rate of the mobile phase solvent 18. In a non-exclusive example, if the sample fraction produces a signal (on either the MIR or non-MIR analyzer) that lasts for ten seconds, and the flow rate of the mobile phase solvent 18 is 3.3 microliters/second, this corresponds to a sample fraction volume of thirty-three (33) microliters.

Somewhat similarly, with reference to FIG. 6, the control and analysis system 30 can compare the relative width of the temporal responses for the same sample fraction between two analyzers. Generally speaking, the length of the sample fraction will be expanding when moving to subsequent analyzers. Thus, the control and analysis system 30 can compare the relative width of the temporal responses for the two analyzers and the difference time between the two can be converted to volume using the flow rate of the solvent 18 to estimate the amount of band broadening.

However, in another embodiment, a Gaussian broadening function can be used to provide a more accurate estimation of band broadening. For example, to calculate band broadening, the control and analysis system 30 can compare the responses from the two analyzers to identify corresponding peaks that relate to the same sample fraction. Subsequently, the control and analysis system 30 can apply a Gaussian broadening function to the narrower of the two peaks. The width of the Gaussian function that results in a match in peak widths (between the responses for the two analyzers) is used as the time. Subsequently, the time can be converted to volume using the flow rate of the solvent 18 to estimate the amount of band broadening.

While the particular systems as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A chromatography analyzer system for analyzing a first sample fraction, the chromatography analyzer system comprising:
 a first MIR analyzer for spectrally analyzing the first sample fraction, the first MIR analyzer including (i) a first MIR flow cell that receives the flowing first sample fraction, the first MIR flow cell having a path length of less than one hundred micrometers, (ii) a first MIR laser source that directs a first MIR beam having a first center wavenumber that is changed over time at the first sample fraction flowing in the first MIR flow cell, wherein the first center wavenumber is tuned over a first MIR wavelength range while the first sample fraction is flowing the first MIR flow cell, wherein the first MIR wavelength range is at least five percent of a MIR range, and wherein the first center wavenumber is tuned over a time frame of less than one hundred milliseconds, and (iii) a first MIR detector that receives light from the first sample fraction in the first MIR flow cell and generates first MIR data of the first sample fraction for the first MIR wavelength range.

2. The chromatography analyzer system of claim 1 further comprising a second MIR analyzer for spectrally analyzing the first sample fraction while the first sample fraction is flowing in the second MIR analyzer, the second MIR analyzer including (i) a second MIR flow cell that receives the flowing first sample fraction, (ii) a second MIR laser source that directs a second MIR beam having a second center wavenumber that is rapidly changed over time in a second MIR wavelength range at the first sample fraction in the second MIR flow cell, and (iii) a second MIR detector that receives light from the first sample fraction in the second MIR flow cell and generates second MIR data of the first sample fraction for the second MIR wavelength range.

3. The chromatography analyzer system of claim 2 wherein the first MIR analyzer and the second MIR analyzer are arranged in series so that the first sample fraction flows from the first MIR flow cell to the second MIR flow cell.

4. The chromatography analyzer system of claim 3 further comprising a control and analysis system that uses the first MIR data and the second MIR data to estimate a time delay between when the first sample fraction flows from the first MIR flow cell to the second MIR flow cell.

5. The chromatography analyzer system of claim 2 further comprising a control and analysis system that uses the first MIR data and the second MIR data to generate a combined MIR data.

6. The chromatography analyzer system of claim 5 wherein the control and analysis system uses the combined MIR data to estimate a characteristic of the first sample fraction.

7. The chromatography analyzer system of claim 5 wherein the control and analysis system identifies a region of interest in the combined MIR data and generates combined MIR spectral data for the region of interest.

8. The chromatography analyzer system of claim 7 wherein the control and analysis system analyzes the combined MIR spectral data for the region of interest to chart chemical changes in a polydisperse sample as a function of elution time.

9. The chromatography analyzer system of claim 2 further comprising a non-MIR analyzer for spectrally analyzing the first sample fraction in a non-MIR range while the first sample fraction is flowing in the non-MIR analyzer, the non-MIR analyzer generating non-MIR data for the non-MIR range.

10. The chromatography analyzer system of claim 9 wherein the non-MIR analyzer, the first MIR analyzer and the second MIR analyzer are arranged in series so that the first sample fraction flows from the non-MIR analyzer to the first MIR flow cell and then to the second MIR flow cell.

11. The chromatography analyzer system of claim 9 further comprising a control and analysis system that uses the non-MIR data, the first MIR data and the second MIR data to estimate a characteristic of the first sample fraction.

12. The chromatography analyzer system of claim 9 further comprising a control and analysis system that uses the non-MIR data, the first MIR data and the second MIR data to estimate at least one of (i) delay times between analyzers, (ii) a volume of the first sample fraction, and (iii) a band broadening of the first sample fraction.

13. The chromatography analyzer system of claim 2 further comprising a third MIR analyzer for spectrally analyzing the first sample fraction while the first sample fraction is flowing in the third MIR analyzer, the third MIR analyzer including (i) a third MIR flow cell that receives the flowing first sample fraction, (ii) a third MIR laser source that directs a third MIR beam having a third center wavenumber that is rapidly changed over time in a third MIR wavelength range at the first sample fraction in the third MIR flow cell, and (iii) a third MIR detector that receives light from the first sample fraction in the third MIR flow cell and generates third MIR data of the first sample fraction for the third wavelength range; wherein the first MIR analyzer, the second MIR analyzer, and the third MIR analyzer are arranged in series so that the first sample fraction flows from the first MIR flow cell to the second MIR flow cell and then to the third MIR flow cell.

14. The chromatography analyzer system of claim 1 further comprising a fractionator that creates the first sample fraction from a sample flowing in the fractionator.

15. The chromatography analyzer system of claim 1 wherein the first MIR analyzer spectrally analyzes a second sample fraction while the second sample fraction is flowing in the first MIR analyzer, and the first MIR detector generates second MIR data of the second sample fraction for the first MIR wavelength range.

16. The chromatography analyzer system of claim 1 wherein the first MIR analyzer has a band broadening of less than twenty microliters.

17. The chromatography analyzer system of claim 1 wherein the first flow cell has a volume of less than ten microliters.

18. A method for analyzing a first sample fraction, the method comprising:
directing the first sample fraction through a first MIR flow cell, the first MIR flow cell having a path length of less than one hundred micrometers;
directing a first MIR beam having a first center wavenumber that is changed over time at the first sample fraction in the first MIR flow cell, wherein the first center wavenumber is tuned over a first MIR wavelength range while the first sample fraction is flowing the first MIR flow cell, wherein the first MIR wavelength range is at least five percent of a MIR range, and wherein the first center wavenumber is tuned over a time frame of less than one hundred milliseconds; and
generating first MIR data of the first sample fraction for the first MIR wavelength range with a first MIR detector that receives light from the first sample fraction in the first MIR flow cell.

19. The method of claim 18 further comprising (i) directing the first sample fraction through a second MIR flow cell; (ii) directing a second MIR beam having a second center wavenumber that is rapidly changed over time in a second MIR wavelength range at the first sample fraction in the second MIR flow cell; and (iii) generating second MIR data of the first sample fraction for the second MIR wavelength range with a second MIR detector that receives light from the first sample fraction in the second MIR flow cell.

20. The method of claim 19 further comprising uses the first MIR data and the second MIR data to estimate a time delay between when the first sample fraction flows from the first MIR flow cell to the second MIR flow cell with a control and analysis system.

21. The method of claim 19 further comprising using the first MIR data and the second MIR data with a control and analysis system to estimate a characteristic of the first sample fraction.

22. The chromatography analyzer system of claim 18 further comprising spectrally analyzing the first sample fraction in a non-MIR range with a non-MIR analyzer, the non-MIR analyzer generating non-MIR data for the non-MIR range; and estimating a characteristic of the first sample fraction using the non-MIR data and the first MIR data with a control and analysis system.

* * * * *